(12) United States Patent
Hansen

(10) Patent No.: US 9,892,653 B1
(45) Date of Patent: Feb. 13, 2018

(54) GUITAR FINGERING AID AND METHOD FOR ITS USE

(71) Applicant: S. Laurie Hansen, Cedar City, UT (US)

(72) Inventor: S. Laurie Hansen, Cedar City, UT (US)

( * ) Notice: Subject to any disclaimer, the term of this patent is extended or adjusted under 35 U.S.C. 154(b) by 11 days.

(21) Appl. No.: 15/485,437

(22) Filed: Apr. 12, 2017

(51) Int. Cl.
*G09B 15/06* (2006.01)
*G10D 3/00* (2006.01)

(52) U.S. Cl.
CPC .............. *G09B 15/06* (2013.01); *G10D 3/00* (2013.01)

(58) Field of Classification Search
CPC ...................................................... G10D 3/00
See application file for complete search history.

(56) References Cited

U.S. PATENT DOCUMENTS

| | | | |
|---|---|---|---|
| 3,822,629 A | 7/1974 | Smith | |
| 4,471,682 A | 9/1984 | Bozung | |
| 5,323,676 A | 6/1994 | Kennedy | |
| 6,369,307 B1 | 4/2002 | Wells | |
| 7,307,290 B2 | 12/2007 | Buffkin et al. | |
| 7,812,233 B1 | 10/2010 | Lee | |
| 8,269,084 B2 * | 9/2012 | Ludwig | G10D 3/043 84/315 |
| 8,878,035 B2 | 5/2014 | Stenbroten | |
| 8,969,694 B2 | 3/2015 | Perry | |
| 2005/0145089 A1 | 7/2005 | Davis | |

\* cited by examiner

*Primary Examiner* — Kimberly Lockett
(74) *Attorney, Agent, or Firm* — M. Reid Russell

(57) ABSTRACT

A guitar fingering aid and method for its use to play a selected musical composition that includes a device for mounting onto a musician's hand that grips the instrument neck where the device is strapped along its top surface onto the one of the musician's middle fingers and includes at least one finger support that projects outwardly from a rectangular web main bar of the device, with the finger support mounted to extend at a right angle outwardly from a face of the rectangular web main bar that includes a string engaging rounded surface formed along the rectangular web main bar lower surface to extend across the instrument neck, and further includes at least a small finger bar for strapping onto the musician's small finger that has a flat string engaging surface, whereby the musician, by moving their hand and fingers appropriately, can pivot, rotate, tilt and vertically move the device and small finger bar up and down the instrument neck, to depress selected instrument strings in a sequence to play a musical composition.

17 Claims, 20 Drawing Sheets

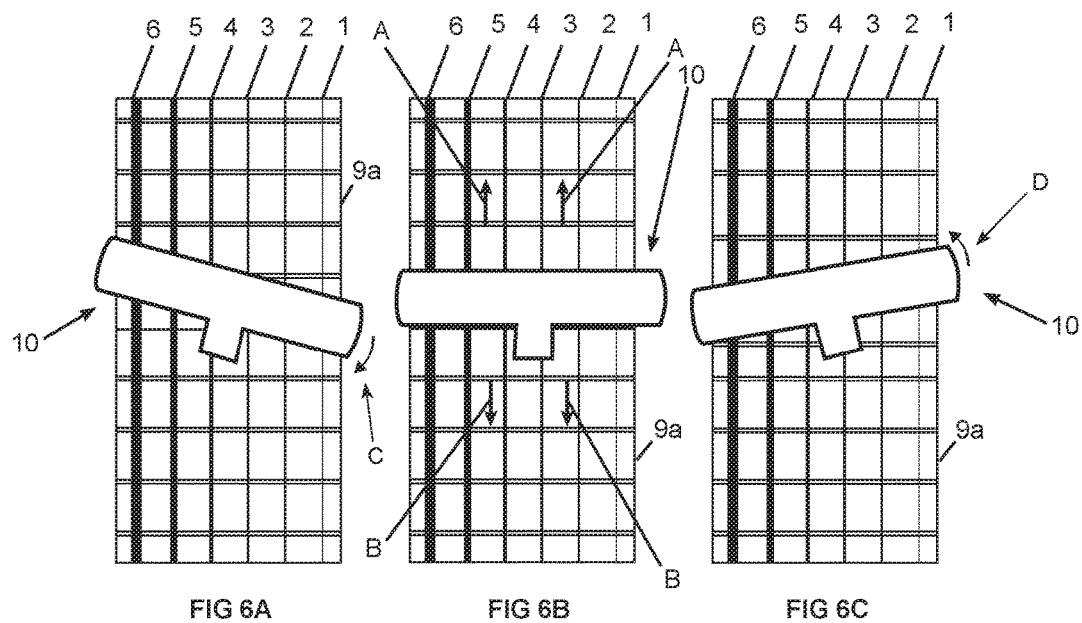

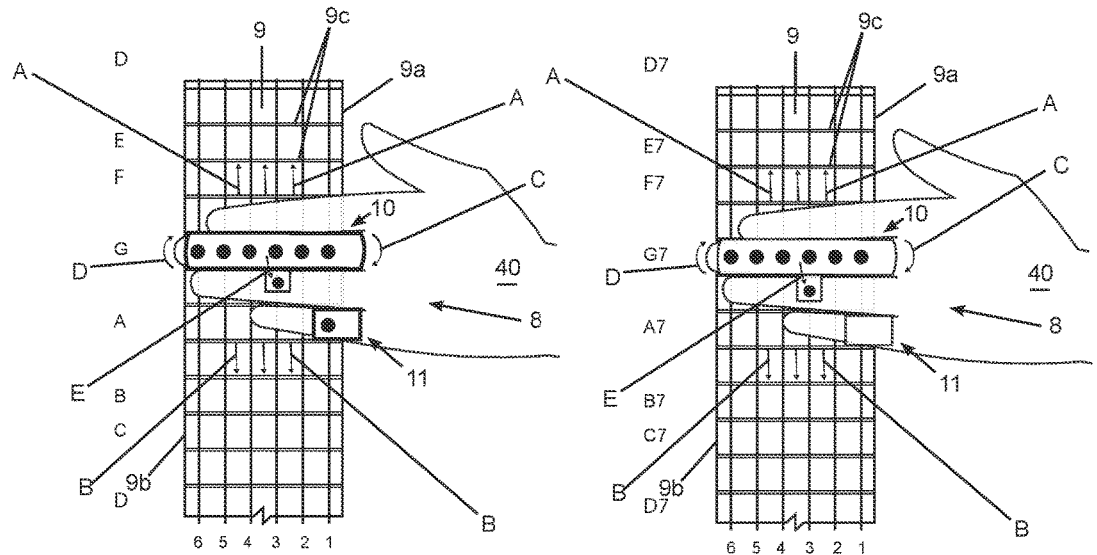
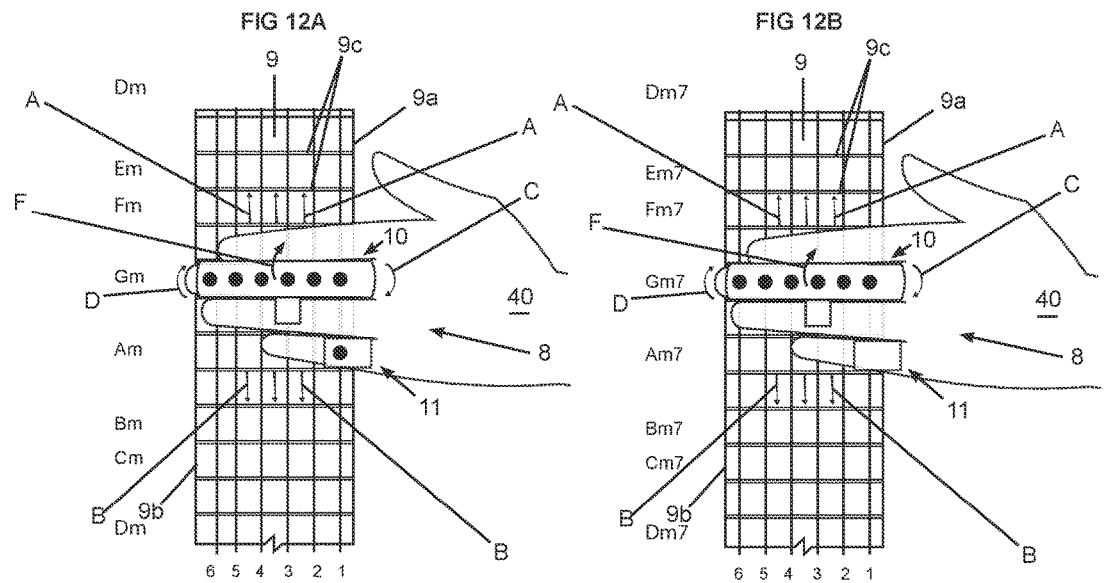

GUITAR FINGERING AID AND METHOD FOR ITS USE

BACKGROUND OF THE INVENTION

Field of the Invention

A guitar fingering aid that is arranged for adjustable mounting to the fingers of a musician with a device thereof for fitting around their middle finger and is supported by at least one of the musician's two adjacent fingers that rest on finger support or supports, and which guitar fingering aid includes one or more small finger bars for adjustable installation onto a guitarist's small finger, where the fingering aid is used to engage the neck of a stringed instrument, such as a guitar, ukulele, banjo, or the like, and to assist to a musician who has difficulty in depressing some or all the instruments strings with their fingers in a normal manner to play the instrument, where such person is impaired or suffers from arthritis, and which fingering aid can be used as a teaching aid for a student learning to play the instrument.

Prior Art

The invention in a guitar fingering aid device is for fitting onto a musician's middle finger and includes a small finger bar that are for assisting a musician who, because of a physical impairment, such as arthritis, finds reaching and pressing the instrument strings with their fingers to be difficult, and is useful for a assisting a person who wishes to learn to play a guitar, or like instrument, who may not have sufficient finger dexterity to correctly and comfortably place their fingers on the instrument strings, or is unable to reach, and or, exert sufficient pressure on, the instrument strings through their fingers to produce a desired sound from the instrument. For such persons, use of the fingering aid allows a musician to continue playing a stringed instrument when they are, or are becoming, physically impaired, and, further, the guitar fingering aid can be used to assist a novice in developing their instrument playing skills.

Where other earlier fingering aid devices have promised to afford a musician, who is experiencing a progressive impairment, such as arthritis, with a capability to play a stringed instrument, such as a guitar, or the like, such have not allowed the musician to play the four predominant chord groups, including all major, minor, seventh and minor seventh chords in a flowing manner, using all the instrument strings, as does the guitar fingering aid of the invention. Such limitations deprive the experienced musician with an ability to play all of the four predominant chord groups that are often required in a composition of most folk, country, pop, bluegrass, religious hymns and traditional songs. Also, the guitar fingering aid of the invention allows the musician to strum or pick all of the instrument strings simultaneously, and allows the musician to utilize their usual playing style, without a need to interrupt the flow of the music. Additionally, while playing not only the four predominant chord groups, it allows for a playing of an additional four common chord groups that include: all sixth, minor sixth, major seventh and minor/major seventh chord groups. Whereas, such uninterrupted play is not possible with earlier devices that often require a changing of such earlier device, as by adjusting positioning of such earlier device, in the body of the song. The guitar fingering aid of the invention allows for the utilization of standard musical principles and does not require that the experienced player relearn a new chording system as earlier devices do.

For the novice musician, the use of the guitar fingering aid of the invention encourages them to develop guitar playing skills that do not require a struggle with chord formation and sore fingers, allowing them to concentration on learning picking and strumming styles before learning to play a guitar in the traditional way. A method for use of the guitar fingering aid allows the use of normal standard musical principles and does not confuse the novice player with non-transferrable methods, as do earlier devices, should they move on to traditional playing method, and does not require an experienced player to relearn an unnecessary system.

SUMMARY OF THE INVENTION

It is a principal object of the present invention in a guitar fingering aid device and small finger bar and method for their use that are arranged for mounting to middle and small fingers, respectively, of a musician's hand, for use with a stringed instrument, such as a guitar, ukulele or banjo, where the aid allows a musician to individually, or simultaneously, press on a string, strings, or on all of the strings that are space apart across the instrument neck to change the pitch, or pitches, of one or more of the strings so as to produce all major, minor, seventh, minor seventh, sixth, minor sixth, major seventh, and minor major seventh group of chords, while still allowing the musician to strum or pick full chords, using all strings of the instrument.

Another object of the present invention is to provide a guitar fingering aid that includes the device that is adjustably secured to a musician's hand, preferably to their middle finger of their hand that holds the instrument neck, and includes a main bar, with one or more separate individual finger supports, that extend from opposite sides of a device main bar web and are for positioning under the musician's finger or fingers, adjacent to their middle finger, and further includes a separate small finger bar for adjustable attachment to the musician's little finger, where the device and the small finger bar are preferably formed from a soft pliable material, and which main bar is curved along its string engaging surface whereby, the musician, by sliding, rolling, pivoting and tilting their hand only while moving their hand up and down the instrument neck, can selectively depress and control the force of contact of the main bar under surface and small finger bar to contact certain of the instrument strings to produce a desired sequence of chords when the instrument strings are strummed or picked.

Another object of the present invention is to provide the guitar fingering aid that includes the device with a main bar that is preferably mounted to the undersurface of one of the musician's middle fingers, and includes one more more separate finger supports that are supported by the musician's finger or fingers, adjacent to the middle finger that the device is mounted onto. Whereby, the main bar undersurface, that is slightly curved from end to end, and has a convex curved undersurface along its length, will extend across the instrument neck conforming to all different sizes and shapes of necks of an instrument. The aid also includes a separate small finger bar, with the main bar and separate small finger bar to be moved by operation of the musician's hand to urge the main bar undersurface and small finger bar into engagement, to depress, selected strings of the instrument during play to produce the chords of a selected musical composition.

Still another object of the present invention is to provide a method, utilizing the guitar fingering aid device and small finger bar that are mounted onto the musician's hand that holds the instrument neck, to play a musical composition.

Still another object of the present invention a guitar fingering aid device is arranged to be be rolled, pivoted, tilted and moved vertically along and across a guitar neck, engaging selected strings thereof by a musician rolling, pivoting and tilting their hand whereon the device is mounted and includes the small finger bar mounted onto the musician's little finger to depress selected strings that the device does not engage, enabling the musician to play the instrument in a style that is essentially like the playing style as they enjoyed before they became handicapped.

Still another object of the present invention is to provide a device having a main bar with a rounded length and is slightly curved along its undersurface such that, when the device is rolled, pivoted, or tilted, the musician, by moving their hand appropriately, can move the main bar under surface into contact selected instrument strings such that the musician, by strumming or picking the instrument strings, can play a selected musical selection.

Still another object of the present invention is to provide a guitar fingering aid that includes the device that is arranged to be easily adjustably fitted onto a finger of a the musician's hand that holds the instrument neck, and includes a finger support or supports arranged for mounting at one or more spaced holes formed through the device main bar web, to project at right angles out from one or opposite sides of the main bar web, and which finger support or supports can be aligned or spaced apart, to avoid a painful arthritic joint, or joints, and receive the undersurface of at least one of the musician's fingers for aiding movement in conformity with movement of the musician's hand while allowing the ends of the fingers to themselves engage selected string of the instrument, with the finger support or supports to also contact selected instrument strings during play, allowing a handicapped musician or novice musician to comfortably play the instrument.

Still another object of the present invention is to provide a device that allows the ends of the fingers of the hand whereto the device is mounted to themselves to engage the instrument strings, and the guitar fingering aid, in addition to the device for mounting to the musician's finger of their hand that grips an instrument neck, includes at least one small finger bar arranged for releasable mounting by straps onto the small finger of the musician's hand that engages the neck of a stringed instrument, such as a guitar, ukulele and banjo, with the combination of the device and small finger bar mounted to the musician's hand to allow a handicapped or novice musician to correctly sequently depress selected strings of the instrument, and apply adequate pressure on which selected strings by moving it along the neck and rolling, pivoting and tilting the device using essentially the same movements of their hand as the musician would have employed before they became impaired.

Still another object of the invention in a guitar fingering aid is to provide a device and small finger bar that allow an accomplished musician to continue playing a guitar, or other string instrument, such as a ukulele or banjo, with the aid of the guitar fingering aid, at a like skill level as they had before they became impaired as by an onset of a debilitating disease, such as osteoarthritis or rheumatoid arthritis, resulting in musician's finger movement becoming painful and difficult, greatly limiting the joy and happiness as they had experienced in playing their instrument. Also, a musician who, through accident, has lost a finger, or use of a finger or fingers, to continue playing their instrument. Also, for a beginning or novice player, use of the invention allows the player to concentrate on learning rather than struggling with chord formations and sore fingers, before choosing to play the guitar utilizing conventional techniques.

The guitar fingering aid of the invention principal features include a device and small finger bar for mounting onto a musician's hand that holds a guitar type instrument neck that are for operation together to facilitate a musician playing a musical composition, allowing that musician to continue to play a guitar, or like string instrument, after they become handicapped or disabled in the manner as they did before they became handicapped or disabled, which guitar fingering aid device and small finger bar can be easily set up with component parts thereof connected together for various instrument open tunings to provide the musician with a capability to play a number of musical selections without changing the device configuration.

Preferably, the guitar fingering aid device and small finger bar are formed from a somewhat flexible material, such as soft vinyl or nylon material, to both support and cushion the musician's fingers and to contact the instrument strings in a fashion that is similar to the musicians usual finger end pressure as they formerly applied through their fingers onto the individual instrument strings.

The invention is in the guitar fingering aid that includes a device and a small finger bar, with the device arranged for mounting onto a musician's finger and includes a main bar that has an instrument string engaging under surface that extends across the web from a palm engaging post to the end of the main bar. Which string engaging surface has a uniform convex curve formed along its length and is concave between the palm engaging post and main bar end, and which palm engaging upper end, and the main bar has flat parallel web sides. Holes are formed at equal spaced intervals through the web sides that individually receive a fastener or fasteners to mount individual finger supports or an outrigger bar to extend outward from which web sides, with at least one of the finger supports is supported by a finger of the musician that is adjacent to their finger that mounts the device. Whereby, when the device is slid along a guitar neck, and is tilted, rolled, pivoted and moved vertically by the musician's hand that mounts the device such that, with the musician's hand guiding the contact with selected strings along the web undersurface and, with the movement of the small finger bar to also contact selected strings, the musician can play a selected musical composition. The spaced holes formed at intervals through the device main web, are to receive a threaded rod fitted therethrough to provide for an attachment of a finger support or supports and/or an outrigger bar. Which rod or rods have threaded ends that are to receive and turn onto, a finger support or supports, and, at least one finger support is mounted onto the end of a rod that has a screw type head. Also, to provide for reuse of the finger supports and outrigger bar, they each have holes formed in ends that can receive a threaded end of the rod, or which individual hole, can receive a sleeve fitted therein that receives the rod threaded end turned therein. The finger supports and outrigger bar are for fitting through selected holes formed through the main bar web to form right angles thereto, and can be aligned, or can be off-set from one another, depending upon the set up configuration of the device. Where the finger supports are aligned, they can each be fitted onto an end of a single rod that does not include a screw type head, where the rod is fitted through one of the spaced main bar web holes. With the device mounted onto the musicians' finger, the finger support or supports undersurface support the finger or fingers of the musician hand that are adjacent to the finger that mounts the device. So arranged, the device is mounted to allow the main bar to be rolled, pivoted, and tilted, as it is moved by the musician's hand up and down the instrument neck, contacting selected points along the instrument strings for the musical composition being played.

The finger supports and outrigger bar can be cylindrical, or have flat or rounded sides and can each be easily released from the rod and screw ends, allowing for the assembly of the finger supports to appropriate positions along the device web for a particular instrument open tuning for playing a selected musical selection. Whereafter, the finger supports and outrigger bar can be easily repositioned appropriately, for the same or another instrument open tuning, to the main bar web to play another musical selection.

The guitar fingering aid and small finger bar or bars are arranged to be easily adjustable, as with straps, to the musician's middle and small fingers, and includes outer surfaces that engage selected instrument strings during instrument playing.

DESCRIPTION OF THE DRAWINGS

In the drawings that illustrate that which is presently regarded as the best mode for carrying out the invention:

FIG. 3A shows the finger support as having received an internally threaded insert that has been turned onto the shaft threaded end to connect to a side of the web;

FIG. 3B shows a profile view of the device of FIG. 1 that illustrates the parameters for forming an arc in the device web undersurface, showing a point of origin and radial distance from that point of origin to the web undersurface;

FIG. 6A-6C show top plan views of the instrument neck with the guitar fingering aid device, shown in solid lines as an outline, positioned across the instrument neck, and showing, with arrows A and B respectively, the device as having moved up and down the instrument neck and shows with arrows C and D the device being pivoted;

FIG. 12A through 12H show the configuration of the guitar fingering aid device of FIGS. 1 through 3A and 5 through 5C for sliding up and down the neck, rolling and pivoting the device, and lifting and lowering the small finger bars, at different positions on the instrument neck to produce eight major cord groups as indicate by the combination of a capital letter adjacent to a small letter and or a number;

DETAILED DESCRIPTION

Figure 1:
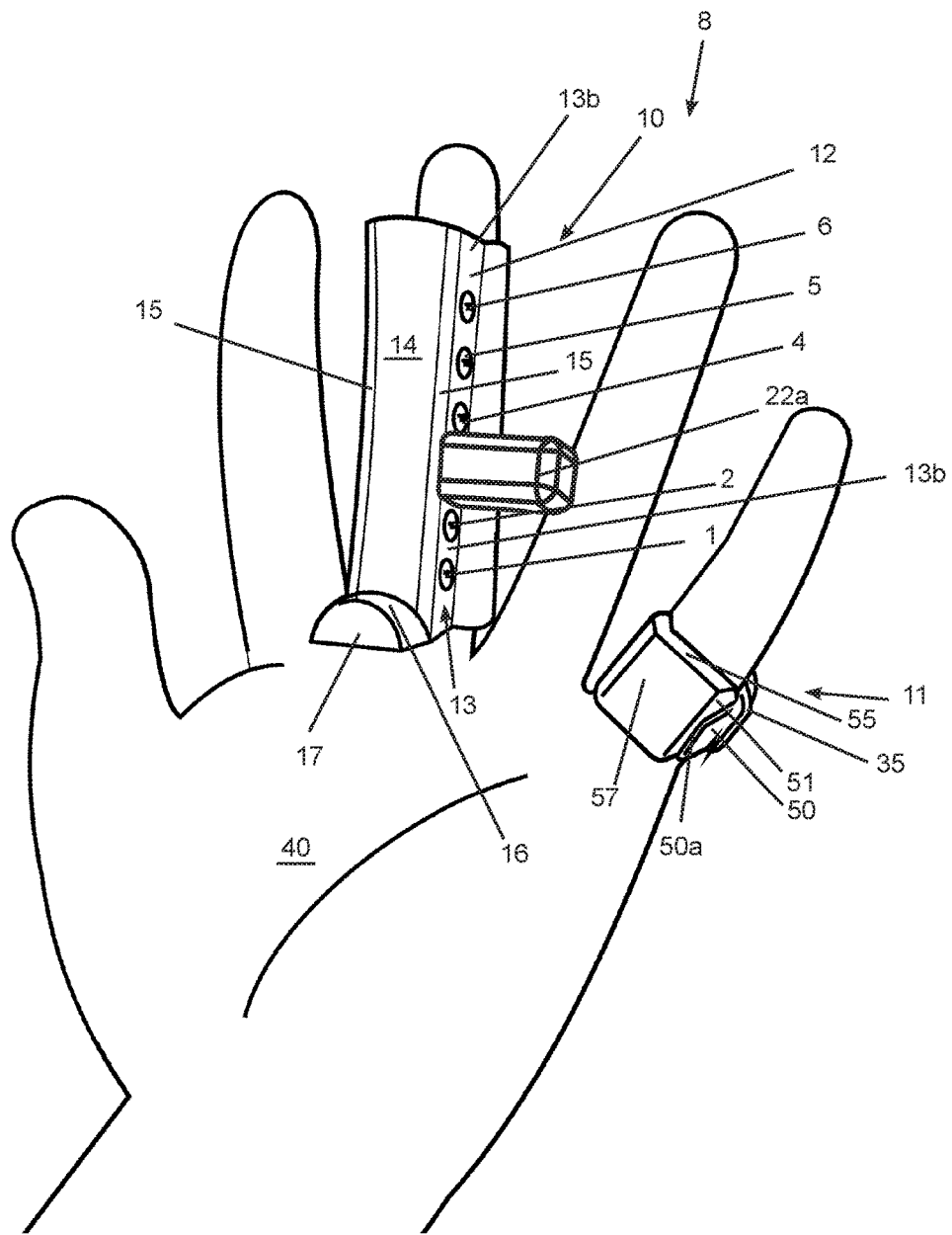
FIG. 1 shows a side elevation view of the palm of a musician's hand whereto a device and small finger bar of the guitar fingering aid of the invention is mounted on a musician's hand, with the device shown fitted onto the undersurface of the hand and with the small finger bar fitted onto the musician's little finger, between the knuckle and junction with the hand.
Figure 1A:
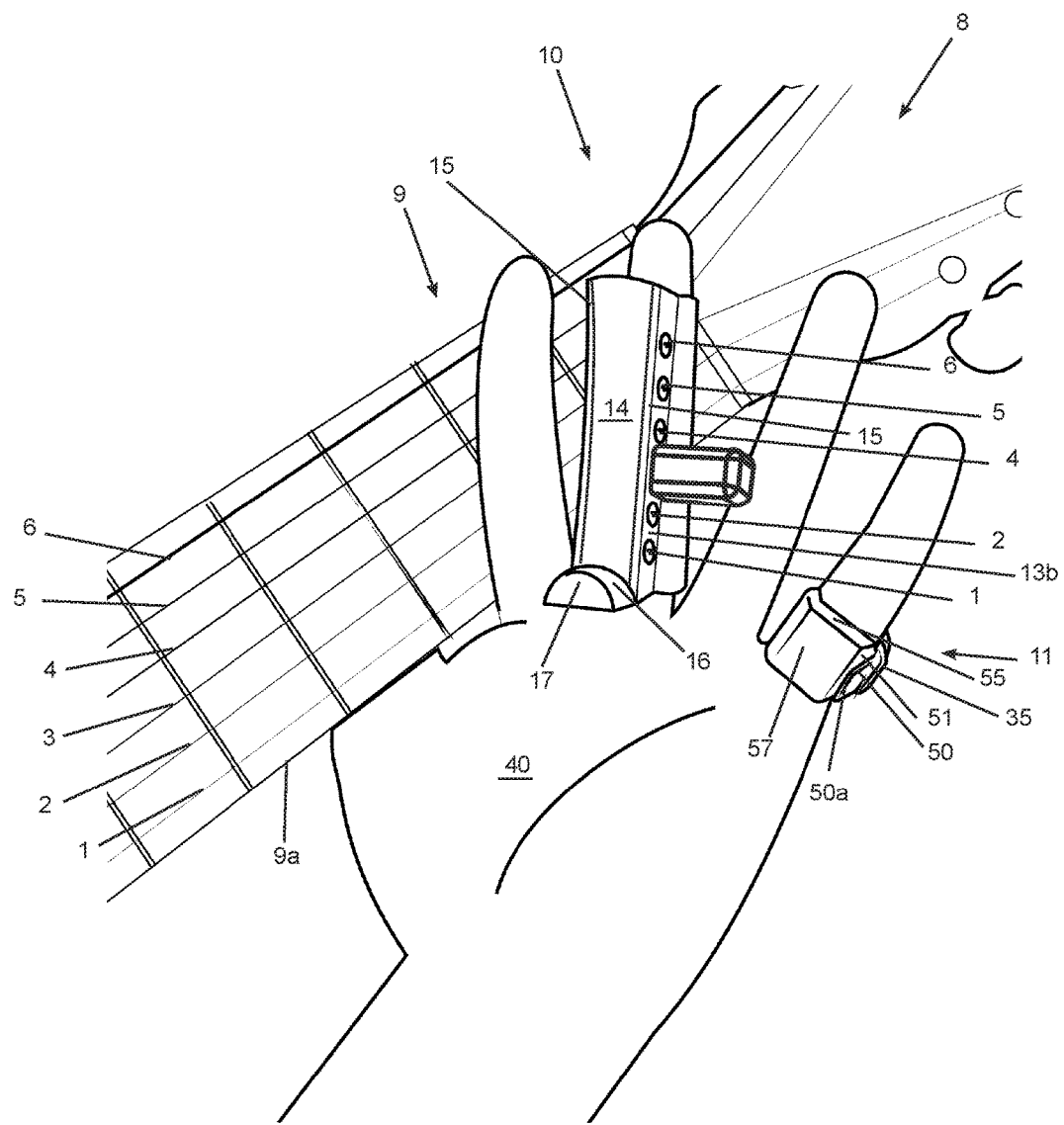
FIG. 1A shows the musician's hand mounting the guitar fingering aid device of FIG. 1, with the musician's thumb, shown as having been passed under a neck of a stringed instrument, proximate to the instrument head stock that is partially shown as an outline that illustrates the head stock as including a tuning machine, as represented by a circle at the end of a second string, prior to the hand being folded over the instrument neck.
Figure 2:
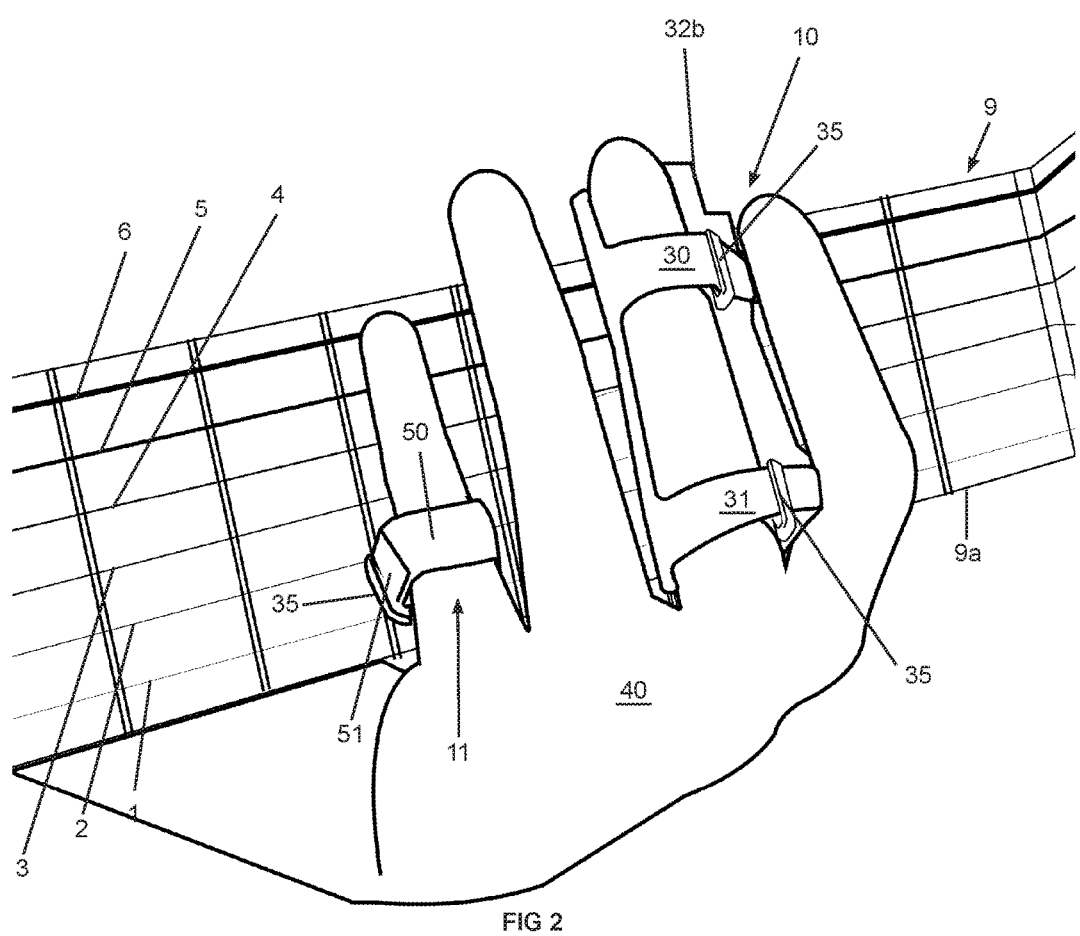
FIG. 2 shows a side elevation perspective view of the top of the musician's hand holding the instrument neck with the guitar fingering aid device and small finger bar of FIGS. 1 and 1A, shown mounted, respectively, to the musician's middle finger and small finger with straps that have been attached at their ends to hold the device and small finger bar in place.

The invention is in a guitar fingering aid 8 that consisting of a device 10 and a small finger bar 11, as shown in FIGS. 1, 1A and 2 that show a basic configuration of the device 10 as including as the device 10 and finger bar 11 that are attached to the musician's hand 40 to allow the musician to apply pressure on strings of a guitar type instrument through the device 10 and small finger bar 11 that, essentially, will duplicate the string pressure as a musician, without an impairment, can apply thereon. In practice, generally, a musician who suffers from a handicap, such as arthritis, often cannot comfortably reach out there fingers, or bend them appropriately, to reach and properly press the instrument strings during normal play. However, such impaired musician can play their instrument utilizing the device 10 and little finger bar 11 of the invention strapped onto their hand 40 that grips the instrument neck 9. Whereby, by moving their hand vertically on the instrument neck 9, and tilting, rotating, pivoting their hand 40, as they did before they became impaired, they can play their instrument. In such play, the use of the device 10 and small finger bar 11 allows a musician to apply a pressure on the instrument string as they could formerly apply through the fingers of their hand onto the individual instrument strings in playing the instrument. Which impaired musician can essentially duplicate their playing style as they used before they became impaired.

Figure 3:
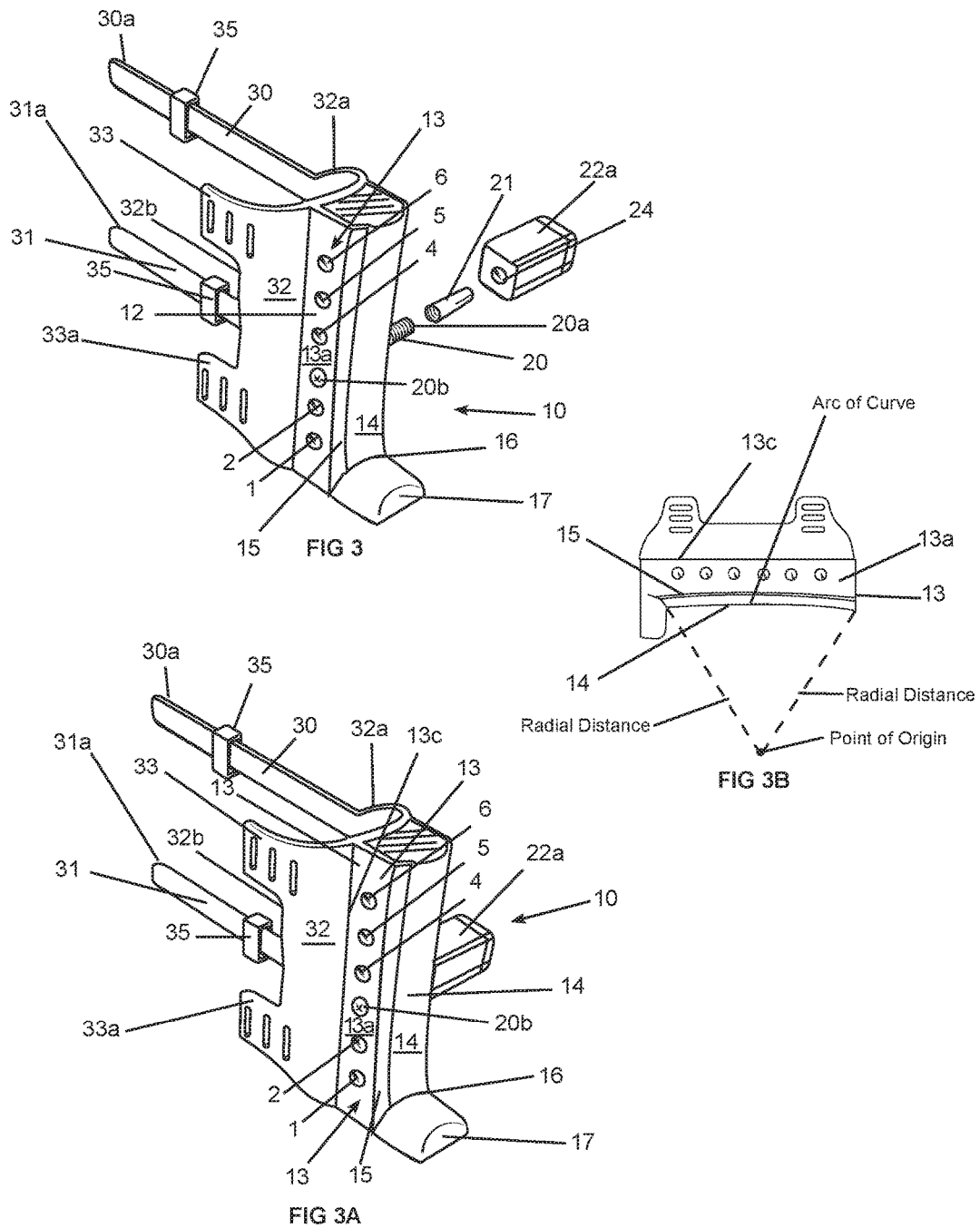
FIG. 3. shows a profile perspective view of a guitar fingering aid device of the invention, as shown in FIGS. 1 through 2, that includes a main bar that has an outer curved surface that terminates, on an outer end, and includes a inner end post, which main bar includes a web that has flat parallel opposite surfaces with spaced holes formed there through that each can receive a shaft, with threaded ends, fitted there through, and shows the shaft aligned to fit into a sleeve that, in turn, fits into an open end of a cylindrical insert of a finger support, with the sleeve shown aligned with a hole formed in an open end of the finger support and is aligned with a sleeve to receive the shaft threaded end, and which device is shown as including straps, with end couplings, that each extend outwardly from a top of which main bar and are each for fitting around for connecting the guitar fingering aid device.

As shown in FIG. 1, and in more detail in side elevation perspective views of FIGS. 3 and 3A, the device 10 includes a main bar 12 that has an outer convex curved surface 14 and whose sides terminate in flat ledges 15 that intersect, at their ends, to an inner curved end 16, of a vertical post 17 that is formed at a right angle to the end of the main bar 12, where the curved end 16 is to engage a surface of an inner guitar neck side. Which vertical post 17 guides movement and pivoting movement of the device 10 as it is moved along an instrument neck 9 side 9a, as shown in FIGS. 1A and 2, and guides rolling, pivoting and tilting of the device 10 during play to contact strings 1 though 6, as taken from the side 9a of neck 9, as shown in FIGS. 1A and 2. The device 10 main bar 12 includes the web 13 that is rectangular in shape with parallel opposite flat sides 13a and 13b. Which main bar web 13 string engaging surface 14 may be flat along is outer surface, from end to end, or, preferably, is slightly curved from end to end, to have a convex outer surface 14, along its length. In practice, the main bar web 13 has opposing parallel sides 13a and 13b and a length that is appropriate to extend across the instrument neck 9, that, in practice, is approximately two and one half inches in length through, the main bar web 13 may be longer or shorter so long as it extends across the instrument neck 9, within the scope of this disclosure.

The main bar web 13, shown in FIGS. 1, 1A, 2, 3 and 3A includes aligned equal spaced holes 1, 2 3, 4, 5 and 6 formed therethrough, taken from the device 10 vertical post 17 surface, where, as shown in FIGS. 3 and 3A, each space hole can receive a shaft 20, fitted therethrough, with, as shown in FIGS. 3 and 3A, the shaft 20 is fitted through a hole 3 that is shown as having a threaded end 20a and has a screw type head formed in its opposite end 20b. FIG. 1 shows the single shaft 20 fitted through hole 3 and has its end 20a aligned with a sleeve 21 that are aligned to fit into an end hole 24 of an end of a finger support 22a. With, in FIG. 3A, the sleeve 21 is shown fitted into the end hole 24 of the finger support 22a with the threaded end 20a of the single shaft 20 to receive the sleeve 21 turned thereon, mounting the aligned finger support 22a onto the device main bar web 13 side 13b, as shown in FIG. 1A.

Figure 8:
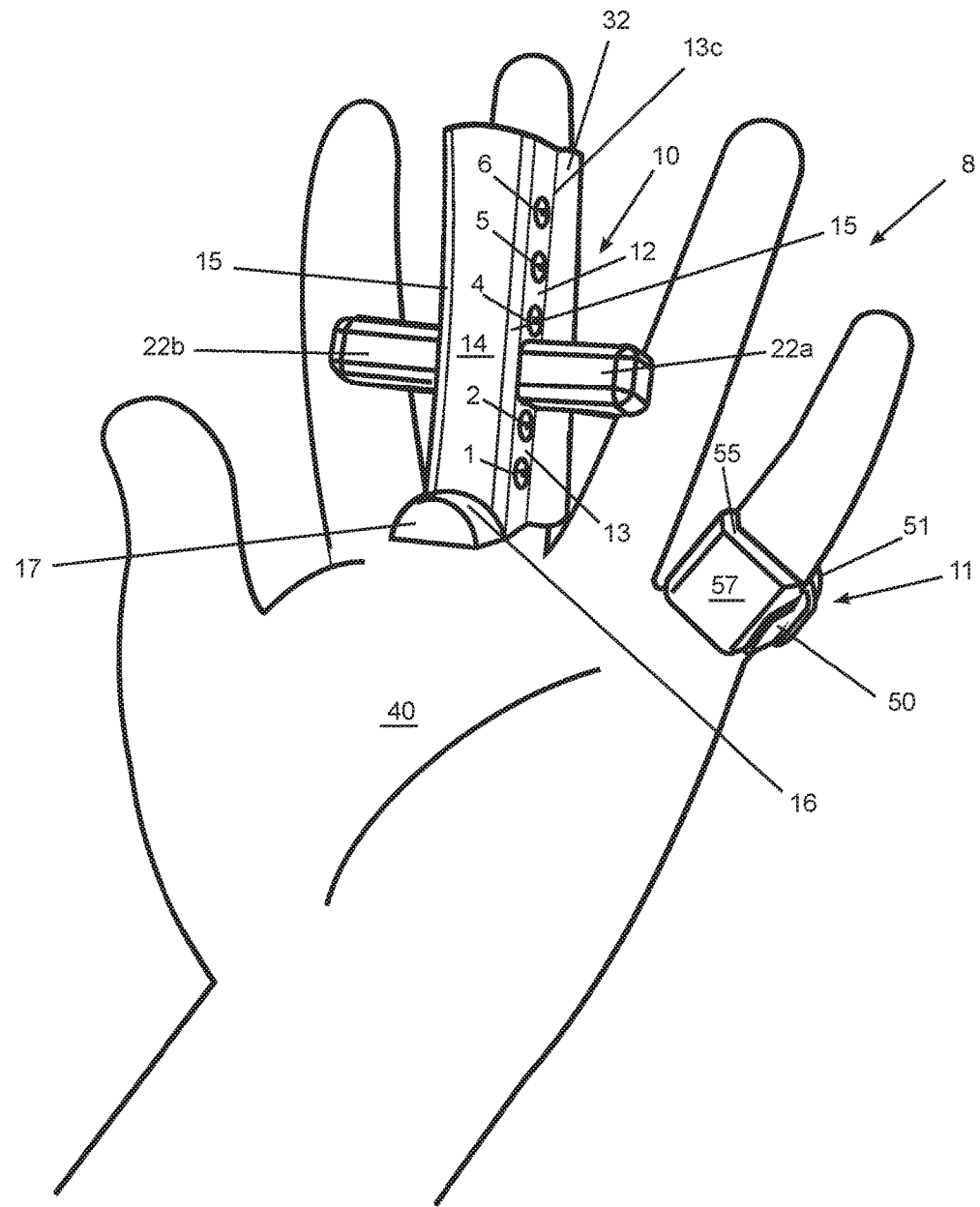
FIG. 8 shows a profile perspective view of the guitar fingering aid device that is like those shown in FIG. 3, that has been fitted onto a musician's hand and, additionally, shows the device as having a pair of finger supports that have been fitted onto a same shaft and connected onto opposite sides of the device main bar web, and showing a small finger bar with a flat head string engaging surface mounted to the musician's small finger.
Figure 9:
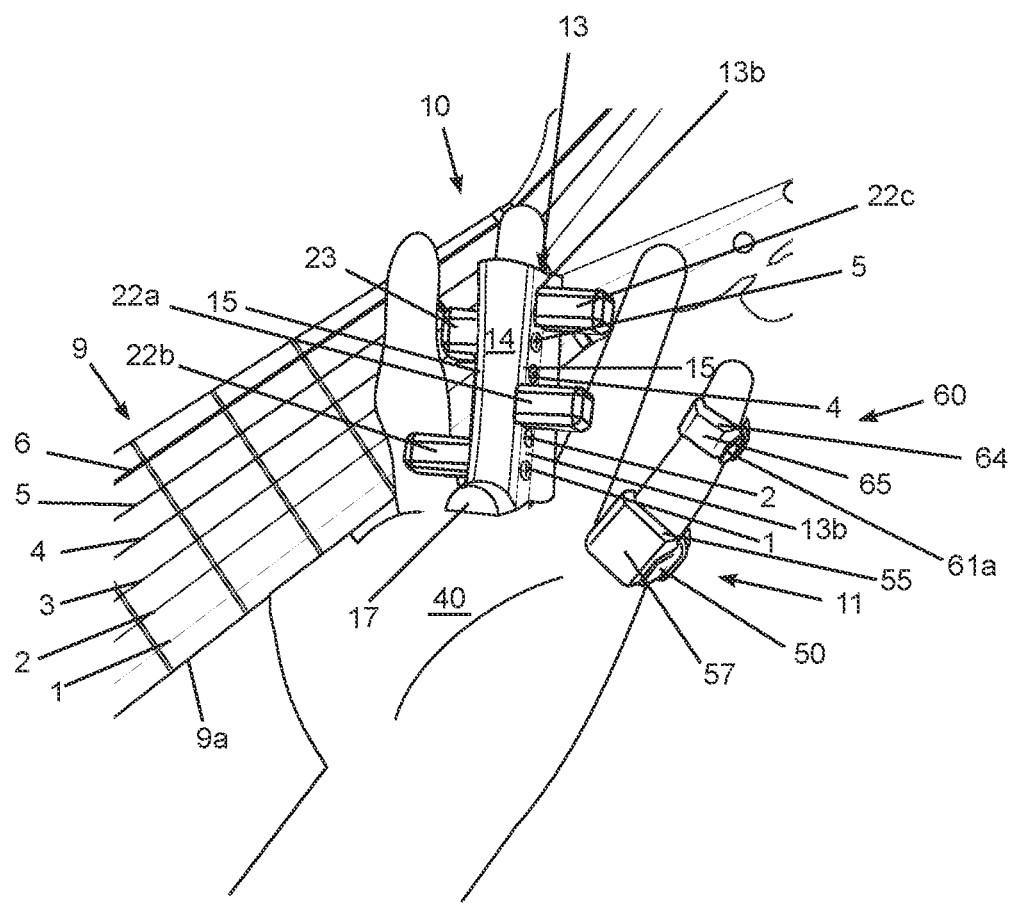
FIG. 9 is a view of the device that shows a mounting of three finger supports, and outrigger bar that are individually mounted to opposite faces of the main bar web, and includes the small finger bar and the second small finger bar, and shows the musician's thumb positioned under the instrument neck for pivoting into engagement with the guitar neck, moving the finger aid device and the small finger bar and second small finger bar into alignment with the instrument strings.

In practice, as an alternative configuration of the device 10, a pair of finger supports 22a and 22b can be mounted onto ends of a single shaft 20, as shown in FIG. 8 that has a length to provide for the attachment of the finger supports 22a and 22b in alignment. Also, it should be understood, that shafts 20 for mounting a finger support 22a, and finger supports 22a and 22b, as shown in FIG. 9, can have a length that is appropriate for fitting into individual finger supports 22a, 22b, and 22c in selected holes 1 through 6 formed along the main bar 12 web 13, as shown in FIG. 9. Which shorter shafts 20, to mount them to the main bar 12 web 13, can include a headed end or ends 20b, as shown in FIGS. 3 and 3A. Accordingly, it should be understood, that the length of the shaft 20 is selected to be appropriate to be fitted into a sleeve 21 that has been fitted into the individual finger support 22a or 22b, or outrigger bar or bars 23 end hole 4, as shown in FIG. 9, as discussed below.

Figure 10:
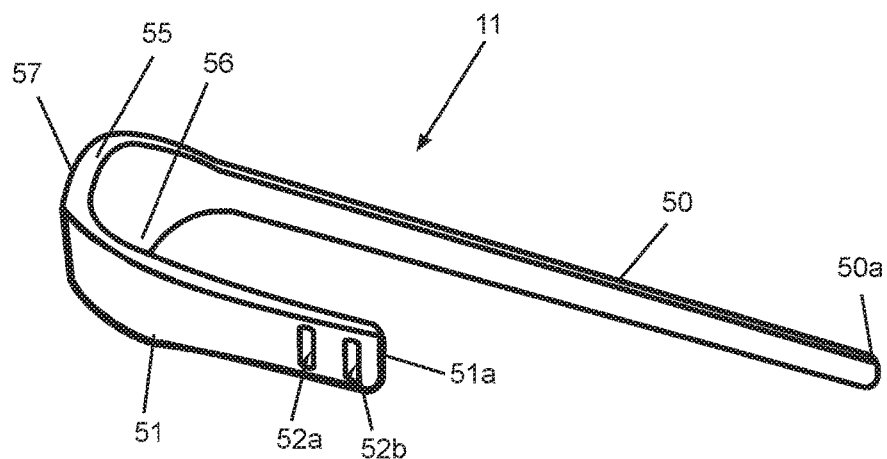
FIG. 10 shows a top elevation view of the small finger bar.

Additional to the basic configuration of the device 10, the guitar fingering aid 8, as shown in FIGS. 1, 1A and 2, and in a side elevation perspective view of FIG. 9, also includes the small finger bar 11, that is shown in a side elevation perspective view of FIG. 10. Shown therein, the small finger bar 11 is mounted onto the musician's little finger, below the knuckle, and proximate to the junction of the small finger to the hand 40. Shown best in FIG. 10, to maintain it around the small finger, proximate to its junction with the hand 40, the small finger bar 11 includes longer and shorter straps 50 and 51 that have, respectively, ends 50a and 51a that attach to a head or top 55 of the small finger bar 11 that is preferably rectangular in shape with rounded top edges 55 and slopes upwardly from a rear end 56, that has a thickness of approximately one fourth of an inch, to a forward end 57 and has a thickness of approximately one eighth of an inch. Shown in FIG. 10, the strap 50 is longer than strap 51 and includes a pair of lateral slots 52a and 52b, that are spaced from one another, with the lower slot 52a to receive an end 50a of strap 50 threaded from the back of the strap through slot 52a and is then threaded from front to back through slot 52b of the strap 51, with the pair of lateral slots 52a and 52b functioning as a buckle to maintain the strap 50 to strap 51 around the musician's finger, coupling the small finger bar 11 onto the musician's finger, as shown in FIGS. 1, 1A and 2.

With the device 10 and small finger bar 11 mounted to the hand 40, the musician, by sliding their hand up and down the instrument neck and tilting, rotating and pivoting their hand appropriately can sequentially engage selected strings 1 through 6 to play the chords of a musical composition. With the device 10 configured, or set up, as shown in FIGS. 1, 1A, 2, 3 and 3A, and with the small finger bar 11 mounted onto the musician's small finger, as shown in FIGS. 1, 1A and 2, the musician can play a number of musical selections without a reconfiguration of the device 10.

Figure 5:
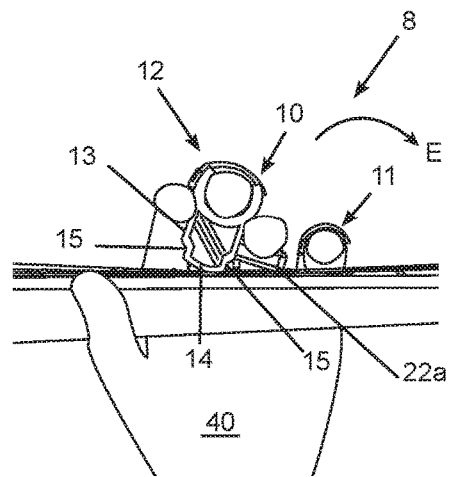
FIG. 5 shows a side elevation view of the instrument neck whereon the musician's instrument neck holding hand has the guitar fingering aid device of FIGS. 1 through 3A mounted thereon that is shown as having been tilted across the instrument neck, as illustrated by a curved arrow E and shows the small finger bar engaging an instrument string.
Figure 5A:
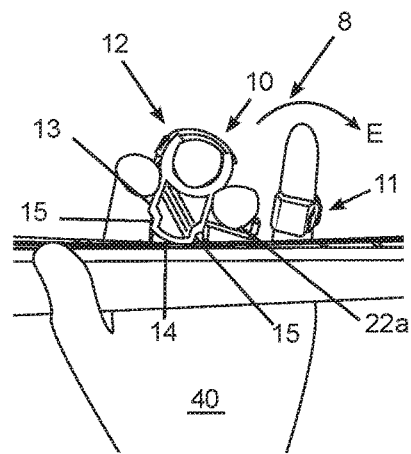
FIG. 5A is a view like that of FIG. 5 only showing the guitar fingering aid small finger bar as having been lifted off of the instrument string.
Figure 5B:
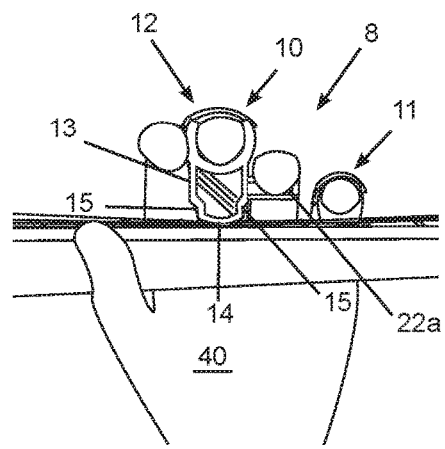
FIG. 5B is a view like that of FIG. 5 only showing the guitar fingering aid device as having been moved back to a flat attitude relative to the neck.
Figure 5C:
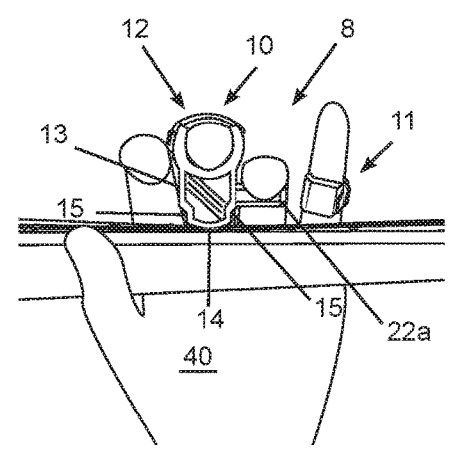
FIG. 5C is a view like that of FIG. 5B only showing the small finger bar as having been lifted off of the instrument string.
Figure 8A:
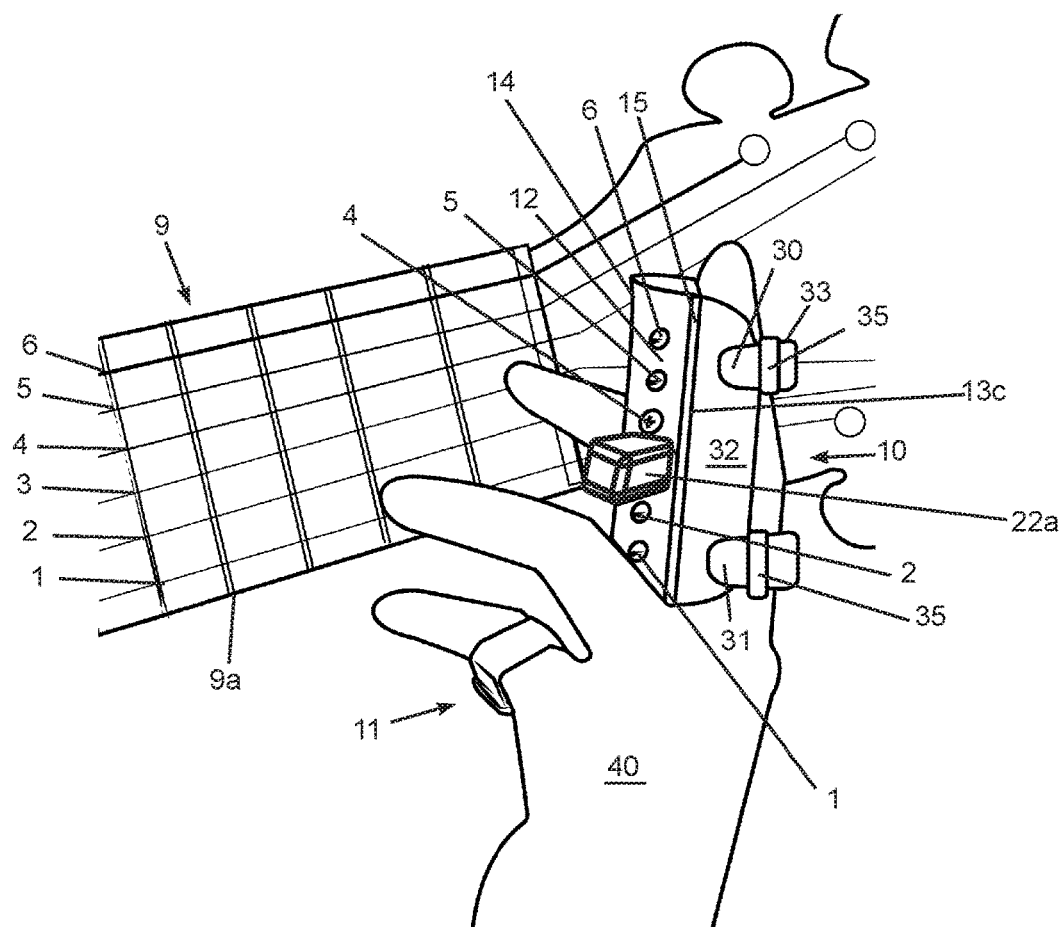
FIG. 8A is a view like that of FIG. 8 showing the musician's hand holding the instrument neck and mounts the guitar fingering aid to their middle finger but with the musician's adjacent fingers extending to where the finger ends engage two separate strings.
Figure 8B:
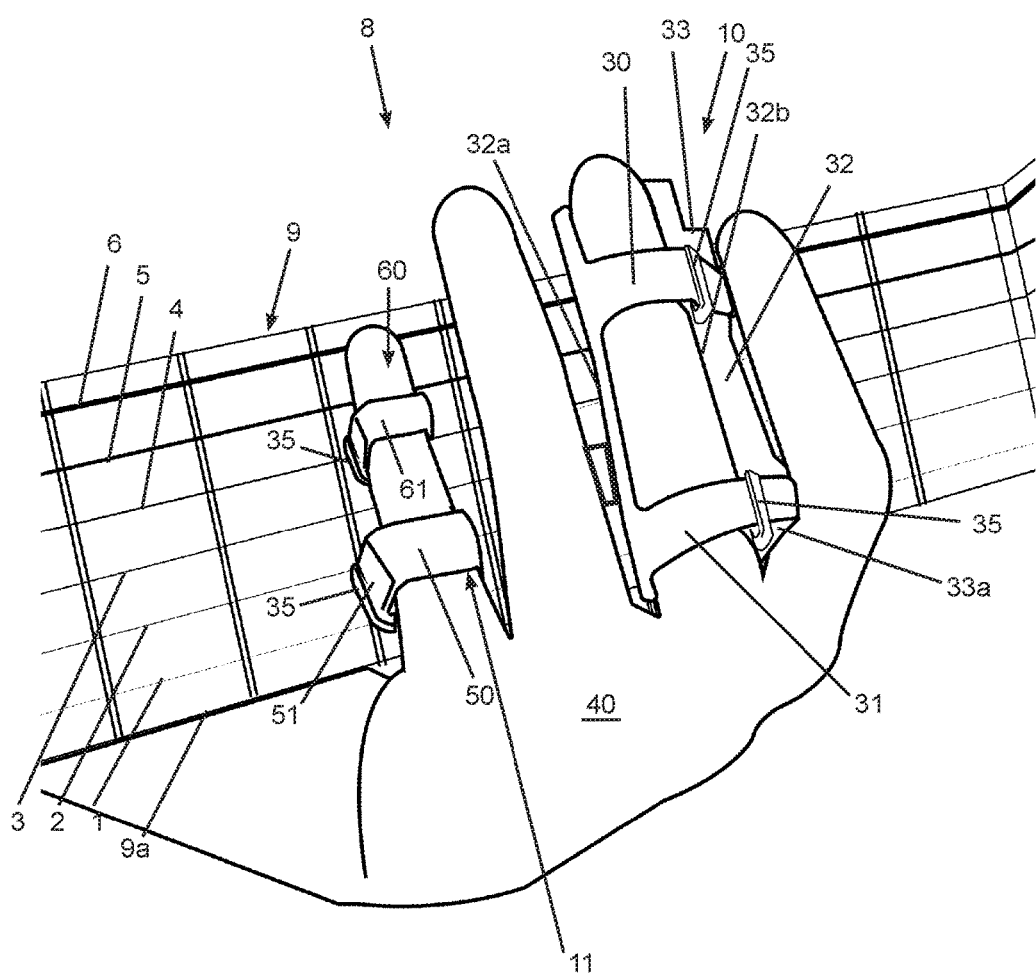
FIG. 8B is a view like that of FIGS. 8 and 8A showing the musician's hand as having been folded over the instrument neck to where the main bar undersurface extends across the instrument neck, and further includes the small finger bar and an additional second small finger bar that are shown as contacting two strings.
Figure 12:
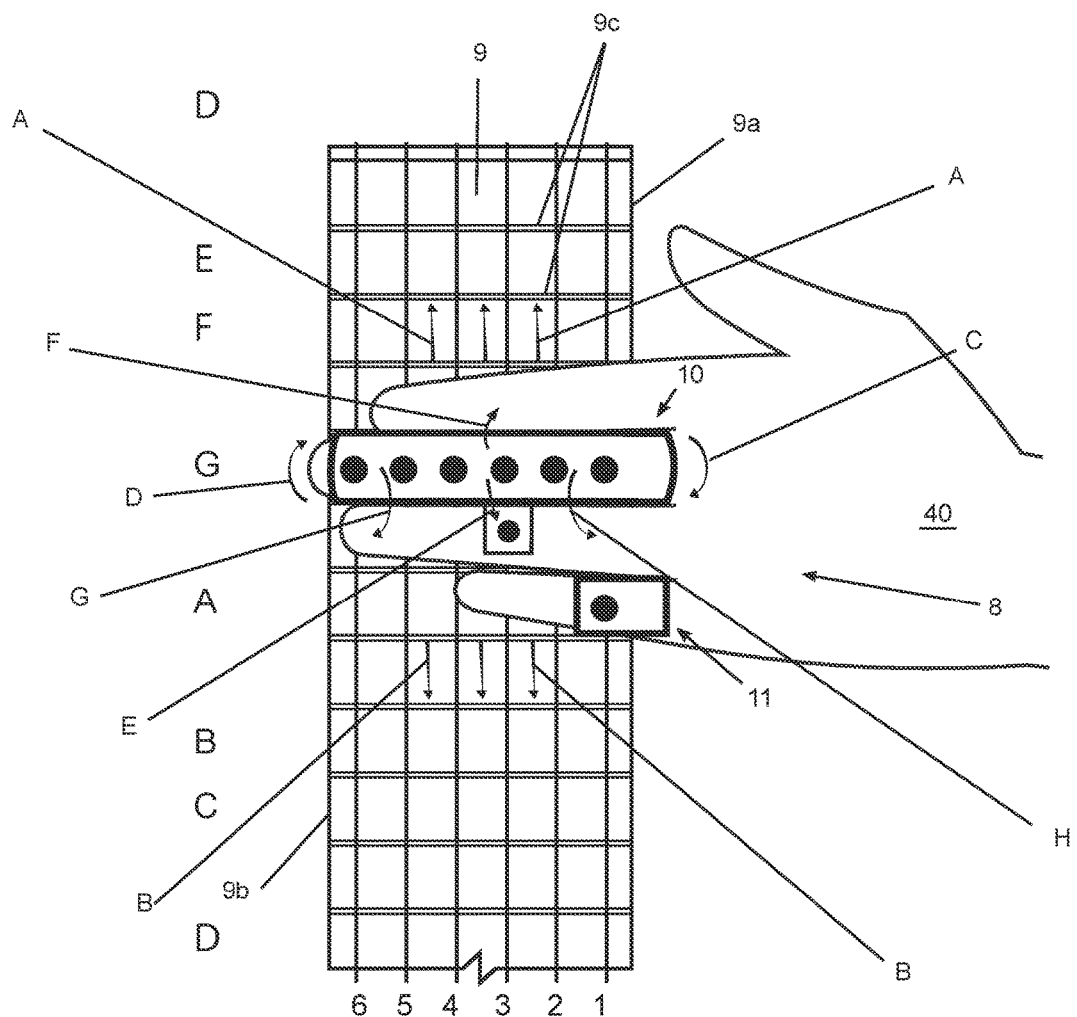
FIG. 12 shows a top elevation view of the guitar fingering aid device and small finger bar of FIGS. 1, 1A, 2, 5 through 5C, and 8 through 8A mounted to a musician's hand, and positioned onto a section of the instruments neck, and shows the neck as mounting the six instrument strings, from left to right 6, 5, 4, 3, 2 and 1, and shows spaced capital letters at spaced intervals along the neck that indicate the root of the chords that can be played by moving the device and little finger bar appropriately along the neck as illustrated by arrows A and B, and shows curved arrows identified by letters C and D that indicate a pivoting of the device, and includes curved arrows E and F indicating, respectively, a lifting of the device to a slanted attitude and a return to a flat attitude, and shows a rolling of the device, illustrated by arrows G and H, that indicates a tilting of the device upwardly or downwardly to press selected strings to play a musical selection, and further shows the first small finger bar as pressing selected strings, and showing, with black spots on the top of the device and finger bar that indicate contact points on the strings 6 through 1.
Figure 12E:
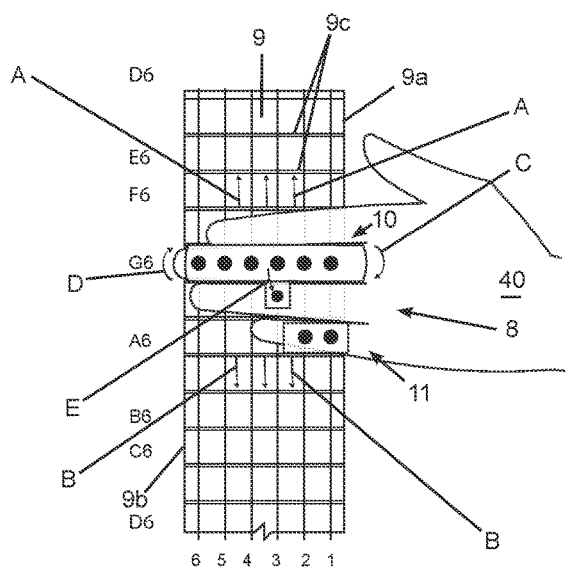
Figure 12F:
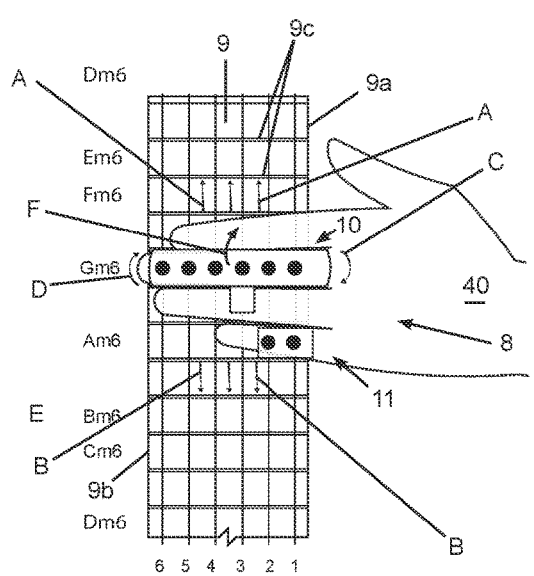
Figure 12G:
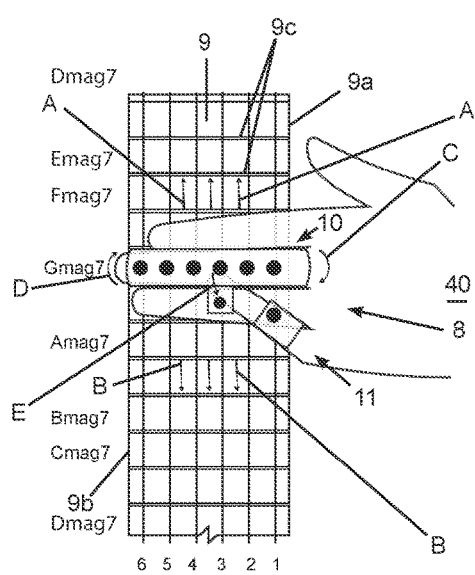
Figure 12H:
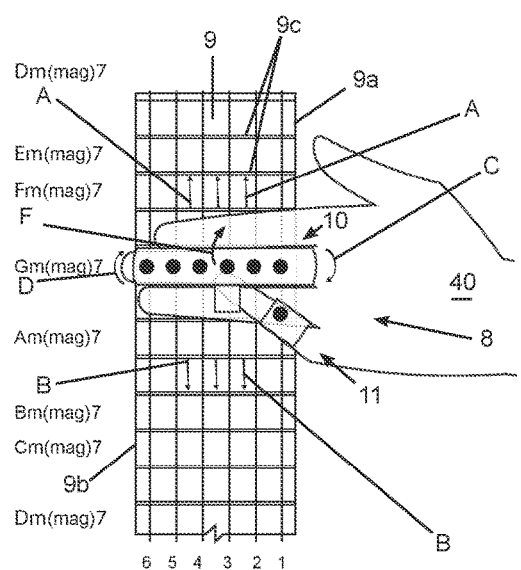

Specifically, in a practice of the method of the invention for playing a musical composition, with the device 10 set up as shown in FIGS. 1, 1A and 2, and with the guitar tuned to open Dm7, as shown in FIGS. 12 through 12H, and which tuning can also be tuned to open Cm7 and Em7, within the scope of this disclosure, the musician can form all Major, Seventh, Minor, Minor Seventh, Sixth, Minor Sixth, Major Seventh, and Minor/Major Seventh Chords, by using a combination of, pressing selected strings to form the chords, while both lifting and lowering of the small finger bar 11, onto strings 1 and 2, as shown in FIGS. 5 through 5C, and pivoting, rolling, and tilting the device 10 to engage the strings 1 through 6, as they move their hand up and down the instrument neck 9. Which positioning of the device 10 and small finger bar 11 is illustrated in FIGS. 12A through 12H, that show the string contacts points as black dots positioned over the respective strings as are contacted during playing of the selected chords to play a musical composition, allowing the musician to form all ninety six (96) of the most commonly used chords. Further, additional to the device 10 basic set up of FIGS. 1, 1A, 2, 3 and 3A, other components of the device 10 can to added to the device 10 basic set up to include, as shown in FIGS. 8 and 8A, the second finger support 22b, and may include the second small finger bar 60, as shown in FIG. 8B as well as additional finger supports 22c along with an outrigger bar 23, as shown in FIG. 9 Where, in such set ups, the finger supports 22a and 22b along with the outrigger bar 23 are mounted to different holes alongside one another through the main bar web 13 sides 13a and 13b, extending outwardly, at right angles, therefrom. As shown, in FIG. 8B, the small finger bar 11 is fitted to the musician's small finger, as shown mounted in FIGS. 1, 1A and 2, and further includes the small finger bar 60 fitted onto the musician's small finger above their knuckle. With the different device set ups here set out, and with the guitar tuned to one of the selected open tunings, as discussed above, one hundred thirty two (132) additional chords can be played with device 10 and small finger bar 11, set up as shown in FIGS. 8B and 9, As set out above, the device 10 can employ a variety of configurations thereof and, along with the small finger bar 11, constitutes the guitar fingering aid 8. Further, the aid can also include, as appropriate, an additional or second finger bar 60, and additional finger supports and one or more outrigger bars 23. The combination of which guitar fingering aid 8 device 10, and small finger bar 11, of FIGS. 1, 1A, 2, 3 and 3A, however, constitutes the basic configuration of the guitar fingering aid 8 of the invention and is for use by a handicapped musician who has lost or damaged a finger or finger, and, additionally, is suitable for use by a novice student who has sensitive finger tips and is discouraged from play by the discomfort associated the redundant depression of the instruments strings, which discomfort can be avoid with a use of the guitar fingering aid.

In practice, the device 10 and small finger bar 11 and second small finger bar 60 are preferably manufactured from a soft moldable material, such as a flexible vinyl or thermoplastic elastomer that will, when pressed onto a string, provide a flow such that, when it is pressed on a string, the soft malleable material tends to flow across and slightly down the string, mimicking the musician's fingers pressing on an instrument string. Also, for the handicapped musician, they often cannot comfortably reach out their fingers, or bend them appropriately to reach and properly press the instrument strings during normal play. Which difficulty can be corrected utilizing the guitar fingering aid 8 of the invention strapped onto their hand 40. In which play, the musician grips the instrument neck 9, and, by moving their hand vertically on the instrument neck 9, and rolling, pivoting, and tilting their hand 40, as they did before they became impaired, can play a selected musical composition. In such play, the use of the device 10 small finger bar 11 and small finger bar 60 allows a like pressure on the instrument strings as the musician could formerly apply through the fingers onto the individual instrument strings in playing the instrument. Which impaired musician can thereby, essentially, duplicate their playing style before they became impaired.

Figure 4:
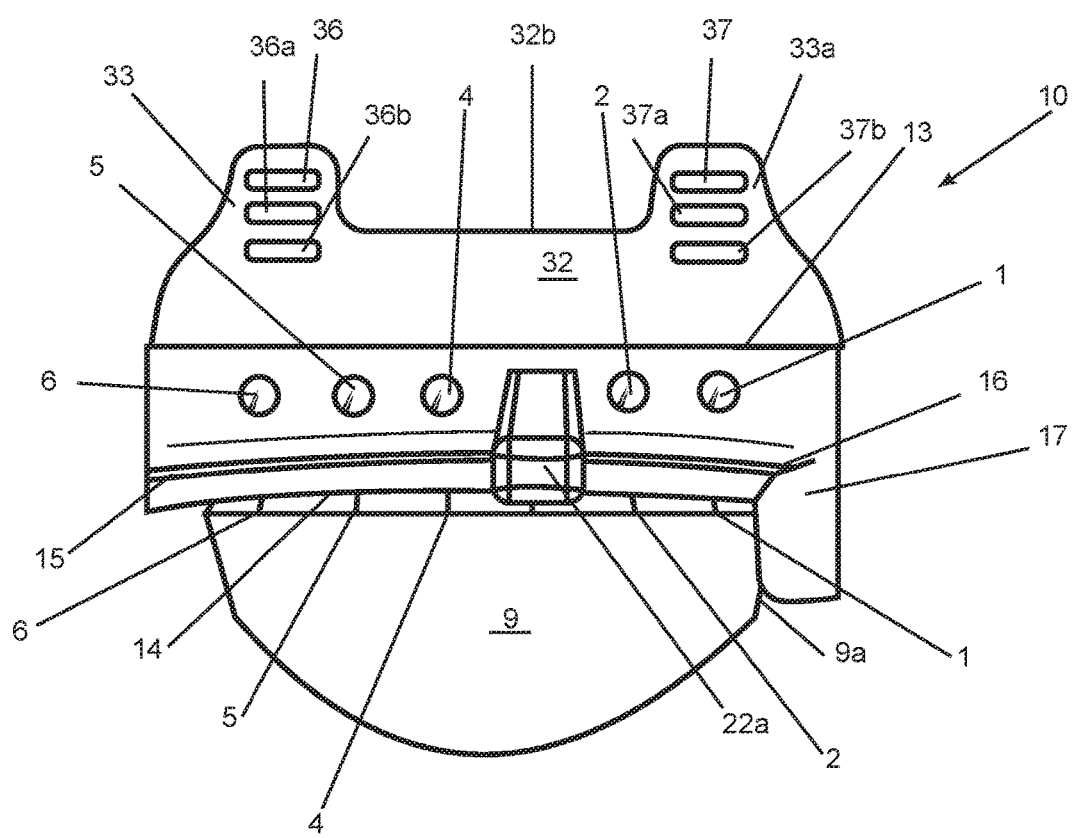
FIG. 4 shows a side elevation view of the guitar fingering aid device of FIGS. 3 and 3A positioned across the strings of the neck of a stringed instrument, and shows the neck as having a flat surface with strings numbered from 1 to 6 out from the end post of the device, which numbers correspond to holes 1 through 6 formed through the device web.

FIGS. 3, 3A and 4 show profile perspective views and a side elevation view, respectively, of the guitar fingering aid device 10 that, like the device 10 of FIGS. 1, 1A and 2, includes the main bar 12 that has an outer convex curved surface 14 whose sides terminate in flat ledges 15 and intersects, on one end 16, to the end of a vertical post 17 formed on an inner guitar neck side engaging surface. A rounded surface 16 of which vertical post 17 guides movement along and pivoting of the device 10 as it is moved up or down along the instrument neck 9 side 9a, as shown in FIGS. 2 and 4, and is shown the basic device 10 of FIGS. 1, 1A and 2 is shown being rolled in FIGS. 5 and 5A by arrow E, and pivoted during play, as shown in FIGS. 6A and 6C and moved vertically along the instrument neck 9, as illustrated by arrows A and B as shown in FIG. 6B.

As set out above, the main bar web 13, shown best in FIGS. 3 and 3A, includes equal spaced 1, 2, 3, 4, 5 and 6 holes formed therethrough, taken from the device 10 vertical post 17 surface, where each space hole can receive a shaft 20, fitted therethrough that can be a threaded shaft or have a screw type head 20b. As shown in FIGS. 1, 1A, 2, 3 and 3A a single shaft 20 is fitted through hole 3 and has its end 20a aligned with a sleeve 21 that is aligned to fit into an open end hole 24 of finger support 22a. So arranged, with the sleeve 21 fitted into the open end 24 of finger supports 22a, the threaded end of the single shaft 20 can receive the sleeve 21 turned therein, mounting the aligned finger support 22*a* onto the device web 13, as shown in FIG. 3A. It should, however, be understood that, within the scope of this disclosure, the sleeve 21 could be dispensed with and the threaded end 20*a* of the shaft 20 could be turned directly into the finger support 22*a* hole 24. The sleeve 21 is, however, preferred to minimize erosion of the finger support 22*a* hole 24 as could occur with different set ups of the device 10.

Strapping for fitting the device 10, onto the musician's hand, as shown in FIGS. 2, 3, 3A, 4, 8A, and 8B, consists of a pair of straps 30 and 31 that are each secured on a coupling end 30*a* and 31*a*, at spaced intervals, to one side 32*a* of a cradle 32, that is connected along edge 13*c* of the main bar web 13, whose other side 32*b* includes like buckles 33 and 33*a* formed in the cradle side 32 for mounting the device 10 to a finger on the hand of the musician that grips the instrument neck. Additionally, as shown in FIGS. 8, 8A, and 8B like strap keepers 35 are arranged to be slid along the straps 30 and 31 and be passed over the strap ends 30*a* and 31*a* after those ends have been passed through each of the buckles 33 and 33*a* lateral slots 36, 36 *a* or 36*b*, and 37, 37*a* or 37*b*, as shown best in FIG. 4. Which keepers 35 are for preventing the straps 30 and 31 from retracting out of the buckles 33 and 33*a* during operation of the device 10. The selection of which buckles lateral slots 36, 36*a* or 36*b* or 37, 37*a* or 37*b* to fit the straps 30 and 31 ends through is to provide a tight fit of the straps 30 and 31 to the musician's finger. With the selection of buckle slots made so as to allow the musician to adjust the fit of the device to their finger circumference.

Figure 11:
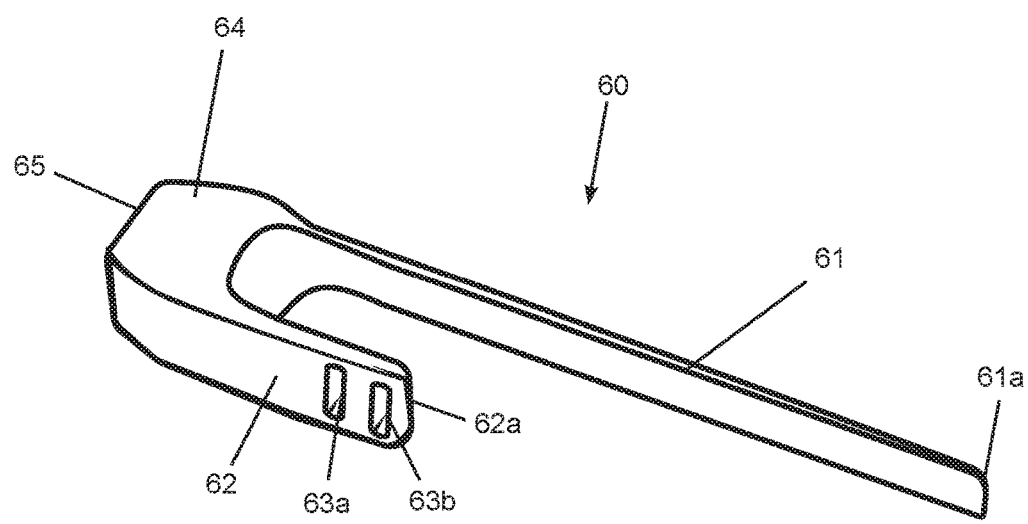
FIG. 11 shows a top elevation view of the second small finger bar.

FIG. 8B shows a second small bar 60 mounted onto the musician's finger that is in addition to the small finger bar 11, as set out above. Which second small finger bar 60, is shown best in FIG. 11 as also having longer and shorter straps 61 and 62 that, like shorter strap 51 of the little finger bar 11, includes a pair of spaced lateral slots 63*a* and 63*b* formed across the shorter strap 62, that are set back from the strap end 62*a*, forming a buckle that the end of the longer strap end 61*a* is threaded therethrough, with the end 61*a* first passed through the lower lateral slot 63*a* from front to back, and is then threaded back to front through the upper lateral slot 63*b* to tighten and hold the second small finger bar 60 of the musician's small finger between that finger joint and the finger end. Like the small finger bar 11, the second small finger bar has a head 64 with a flat top surface 65. However, distinct from the small finger bar 11, the second small finger bar 60 in that a head 64 has a greater depth or thickness of approximately one half of an inch as compared to the small finger bar 11 that has is approximately one quarter of an inch thick and tapers to an eight of an inch depth or thickness, and the second small finger bar 60 is also different in that the head 64 as a lesser height which measures approximately three eights of an inch compared to the small finger bar 11 that is approximately five eights of an inch tall. Though, it should be understood, that the depth or thicknesses of the small finger bar 11 head or top 55 and that of the second small finger bar 60 head or top 64 can be slightly greater or smaller, within the scope of this disclosure.

FIG. 8 shows a set up of the device 10 that includes a pair of finger supports 22*a* and 22*b* that are shown attached to the main bar web 13, to extend outwardly, at right angles, from the sides 13*a* and 13*b* thereof and additionally shows the small finger bar 11 fitted onto the small finger of the musician's hand 40. Which finger supports 22*a* and 22*b* are shown aligned with one another and are preferably mounted onto threaded ends of a single shaft 20 that is shown as having been fitted through main bar web 13 hole 3. The device 10 of FIG. 8, it should be understood, could be mounted to fingers on either side of which middle finger, and, within the scope of this disclosure, the finger supports 22*a* and 22*b* could be mounted through any one of the web holes.

For an aligned attachment of the finger supports 22*a* and 22*b* the single shaft 20 with threaded ends 22*a* and 22*b* of an appropriate length is used, as set out above. However, to provide another set up of the device 10, where the finger supports 22*a* and 22*b* are not aligned, as shown in FIG. 9, individual shorter shafts 20 with screw type heads 20*b* are preferably used, and, of course, can also include sleeves 21, like the sleeve 21 shown in FIG. 3, with the sleeves aligned to fit into the finger support 22*a* and 22*b* and outrigger bar 23. Which sleeves 21 are to each receive a threaded end of each of the shafts 20 aligned for turning in which sleeve or sleeves. Shown in FIG. 9, the device 10 includes the outrigger bar 23 is shown fitted through the main bar web 13 hole 5, with the finger support 22*a* fitted through the main bar web 13 hole 3, the finger support 22*b* fitted through the main bar web 13 hole 1, and the finger support 22*c* fitted through the main bar web 13 hole 6, as another example of a device 10 set up configuration that is distinct from the set up shown in FIGS. 1, 1A, 2, 3A, and 8.

Figure 7:
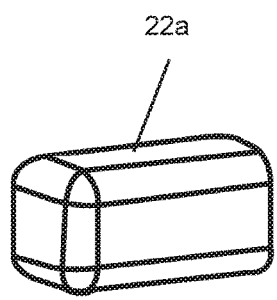
FIGS. 7 through 7B show profile perspective views of a pair of finger supports and additionally shows an outrigger bar in FIG. 7B, which finger supports and outrigger bar are for mounting onto threaded shafts to the web of the main bar web.
Figure 7A:
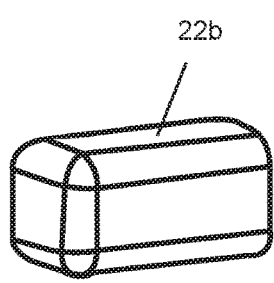
FIGS. 7C through 7E show end views of the finger supports of FIGS. 7 through 7A and outrigger bar of FIG. 7B as having longitudinal cavities formed off center therein that are for turning onto threaded shaft ends, that, alternatively, can each receive a female threaded insert that are each for turning over threaded shaft ends, as shown in FIG. 3.
Figure 7B:
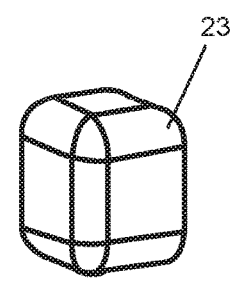
Figure 7C:
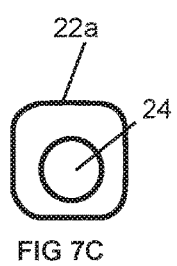
Figure 7D:
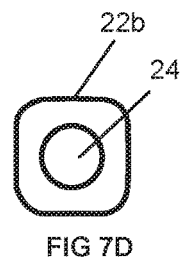
Figure 7E:
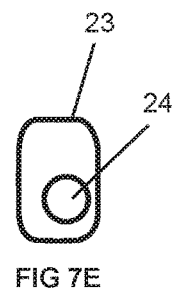

Shown in FIGS. 7, 7A and 7B are enlarged configurations of the finger supports 22*a* and 22*b*, and the outrigger bar 23. In FIGS. 7 and 7A, the finger supports 22*a* and 22*b* have like configurations with square ends and rectangular bodies and, include diagonally cut corners. With the outrigger bar 23, as shown in FIG. 7B, has a rectangular face and sides with the distance between the top and bottom thereof shown as narrower than the sides of the finger supports 22*a* and 22*b*, through, it should be understood, the finger supports and outrigger bar can all have the same dimensional height. Further, the finger support 22*c*, as shown in FIG. 9, can have the same dimensions as the finger supports 22*a* and 22*b*, or can be different therefrom, within the scope of this disclosure. Additionally, as shown in FIG. 7C through 7E, the finger supports 22*a* and 22*b*, along with the outrigger bar 23, each include a hole 24 formed in an end thereof, which holes 24 can be centered or off centered within the scope of this disclosure Similarly, the finger supports 22*c* and 22*b*, as shown in FIG. 9, will also have holes in one end of each that, in practice, can be centered or off-centered. In practice, the center hole 24 arrangement allows the musician to conveniently turn the finger support or supports or outrigger bar to raise or lower the finger support or outrigger bar surface that is opposite to the instrument strings so as to facilitate their contacting a string or strings during play of a musical composition. Also, it should be understood, the surface or surfaces of the finger supports 22*a*, 22*b*, and 22*c* and outrigger bar 23 can be flat, rounded or sloped to accommodate the musicians abilities for them to play a particular musical composition, within the scope of this disclosure.

Shown in FIG. 12, the device 10 finger support 22*a* and small finger bar 11 set up, as shown in FIGS. 1, 1A, and 2, is appropriate for playing a number of musical compositions where the strings of a guitar to D, A, D, F, A, and C, are tuned for open tuning Dm7. Meaning that the Dm7 chord is played without pressing the device 10 or small finger 11 onto the strings. Which tuning is accomplished by just strumming or picking the guitar strings. Such open tuning dictates the way the device 10 finger support 22*a* and small finger bar 11 are setup, and is an appropriate setup, for other tunings Cm7 and Em7.

FIG. 12 shows the device 10 with the finger support 22a and small finger bar 11, as shown in FIG. 1, 1A, 2, aligned with the strings 1 through 6, and shows black dots on the top surfaces thereof of the main bar 12 finger support 22a and small finger bar 11, that indicate where the strings can be pressed against the fret board for forming a chord or chords.

FIGS. 12A through 12H show the tuning of FIG. 12, with the set up of the device of FIGS. 1, 1A and 2, that include the main bar 12, finger support 22a and small finger bar 11, with spaced letters arranged alongside an outer edge 9b of the guitar neck 9 that align with frets 9c to indicate where the root chord position is located. Which positioning of the spaced letters along the outer edge 9b indicates the chord being played. For example, G is the root chord of the G major chord, as shown in FIG. 12A. In practice, the device 10 set up with the main bar 12, finger support 22a and small finger bar 11 can press the strings against the neck 9 on selected frets, for all the root chords. In the chosen chord formation, the musician's hand can move up and down the instrument neck 9 to the selected root position, as shown by straight arrows A and B, can be pivoted as illustrated by curved letters C and D, and rolled forward or held flat as illustrated by small curved letters E and F, and tilted downward or upward as illustrated by curved arrows G and H. Which tilting hand movements are appropriate for all device set up configurations, as set out above. In practice, the motions A through H, as detailed above, can be used separately or in different combinations and different set up configurations to form the chords allowing all twelve frets to be be reached.

In practice, once the root note position is found, the musician can press the device 10 and small finger bar 11 to form the chords as shown in FIGS. 12A through 12H, which are correspondently major, seventh, minor, minor seventh, sixth, minor sixth, major seventh and minor major seventh chord formations.

The above illustrates the versatility of the guitar fingering aid 8 in that, using the device 10 and small finger bar 11 the musician can play 96 cords without re-tuning the instrument. This capability essentially duplicates the playing capabilities of a non-impaired musician, and, with a re-tuning of the instrument, and with different set ups of the device 10 and with an inclusion of the small finger bar 60 the impaired musician can essentially play all the cords that the non-impaired musician can play. Greatly exceeding the capabilities of any other guitar fingering aid.

The use of the guitar fingering aid 8 of the invention provides a handicapped or novice musician with a method and capability for them to continue to play their instrument after they became handicapped or wish to learn to play their instrument. Additionally, the invention includes a method for use of the guitar fingering aid 8 to conveniently and comfortably play selected musical compositions.

Figure 13:
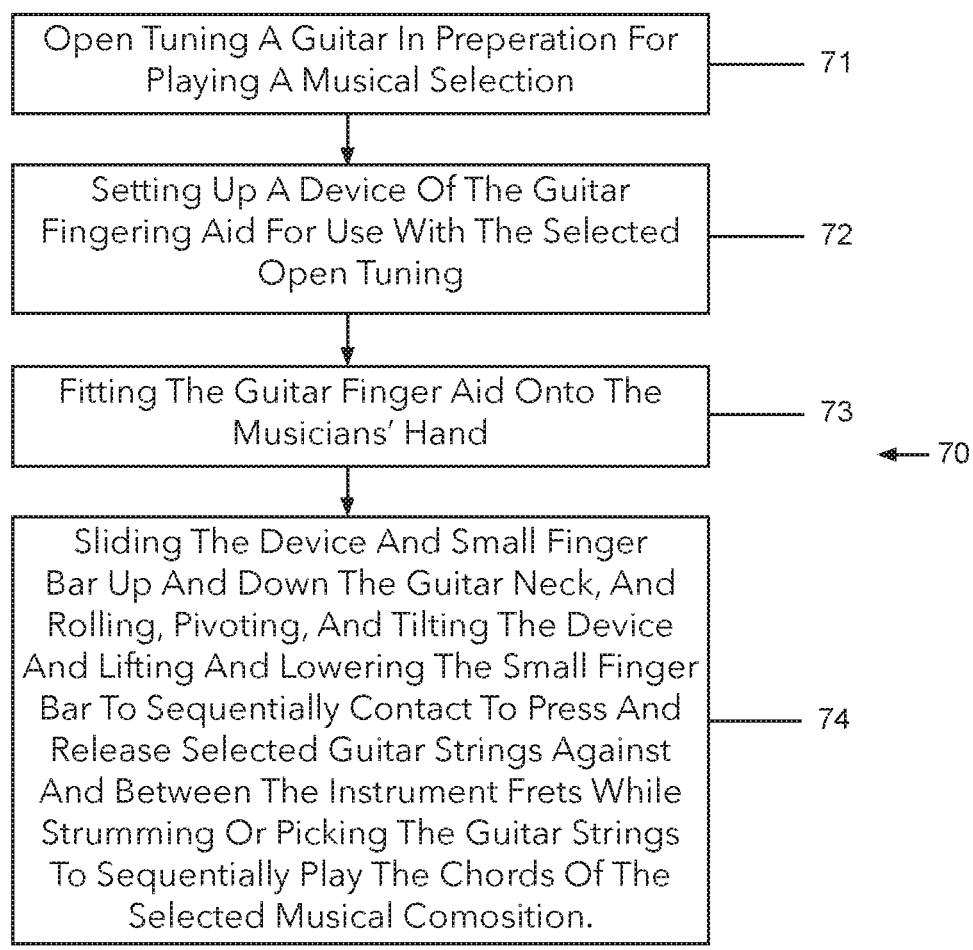
FIG. 13 shows a block flow schematic setting out the steps for playing a selected musical composition utilizing the guitar fingering aid of the invention.

FIG. 13 shows a block flow schematic 70 illustrating the steps followed in a practice of the method of the invention for playing a selected musical selection on a guitar type musical instrument utilizing the guitar fingering aid 8 of the invention. A choice of which tuning of the instrument is set out in block 71 as a first step in preparation for playing the musical selection. With the instrument tanned appropriately, block 72 sets out the step of setting up the device 10 and small finger bar 11 and block 73 sets out the step of mounting the device 10 and small finger bar 11 onto the musician's hand 40 that holds the guitar neck. With block 74 showing a musician playing a selected musical composition utilizing the guitar fingering aid 10 and small finger bar 11 mounted to their hand 40 by moving their hand up and down the instrument neck while appropriately rolling, pivoting and tilting the device 10 and lifting and lowering the small finger bar 11 to engage and press and release sequentially selected strings to play the chords of the selected musical composition. With the device 10 and small finger bar 11 fitted to the musician's hand 40, block, 74 sets out, by movement of the musician's hand 40 and fingers up and down the instrument neck, the musician, by rolling, pivoting and tilting of the device 10 and lifting and lowering of the small finger bar 11 appropriately can play a selected musical composition by sequentially depressing the individual instrument strings against the instrument frets and between the instrument frets while strumming or picking the strings, playing the selected musical composition.

Figure 14:
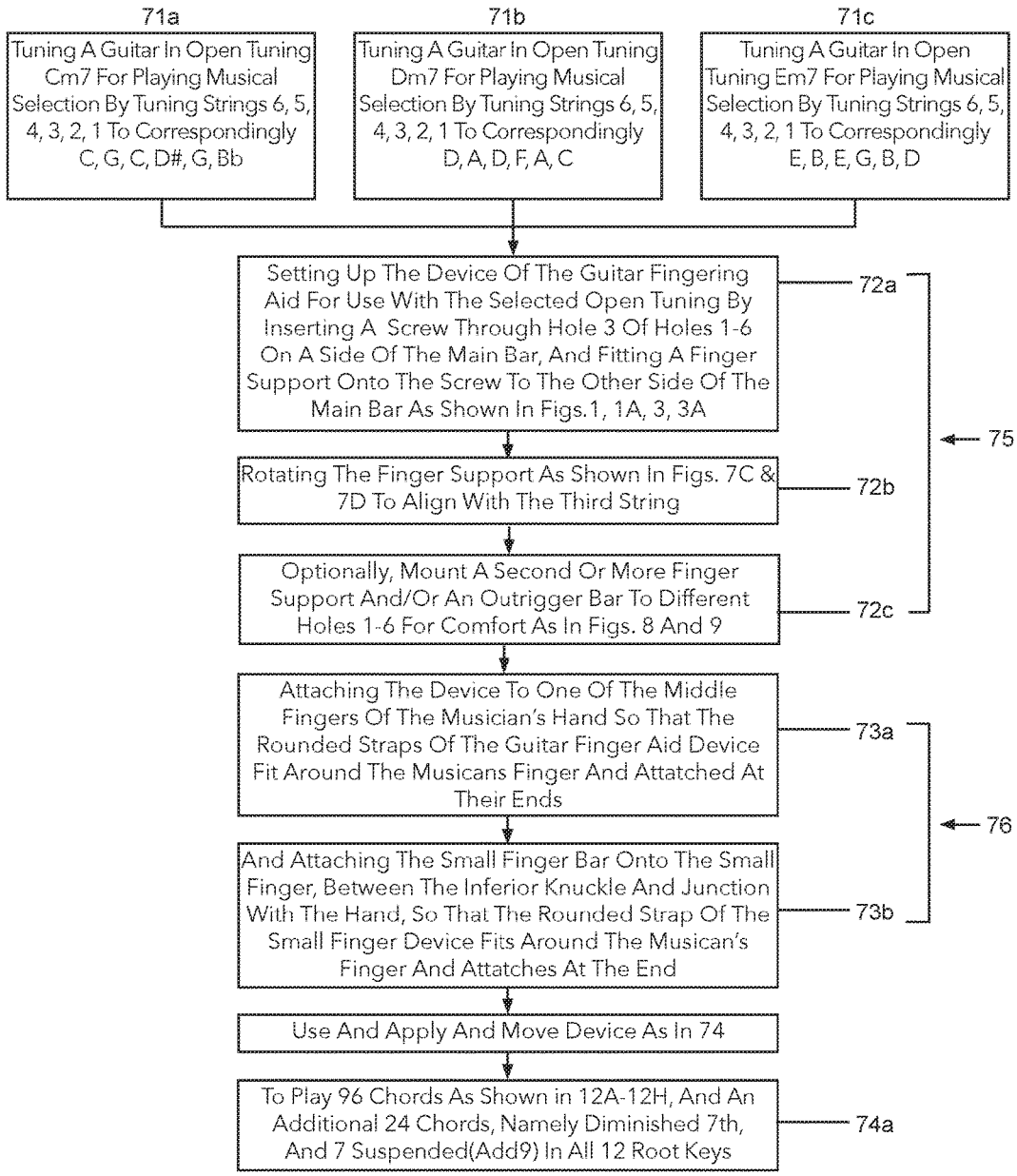
FIGS. 14 through 14B show blocks depicting open tunings of the instrument and the set ups of the device and small finger bar and second small finger bar of the guitar fingering aid that are appropriate for playing selected chords of a musical composition for the chosen open tunings.

FIG. 14 shows dependant steps set out as blocks 71a and 71b and 71c that further set out the different open tunings of block 71, with blocks 72a, 72b and 72c showing basic set up arrangements of device 10, and block 73b showing the placement of the small finger bar 11, as shown in FIGS. 1 through 4 and FIGS. 8 and 8A. Whereby, by fitting the components thereof together the musician can play playing the selected musical selection.

Figure 14A:
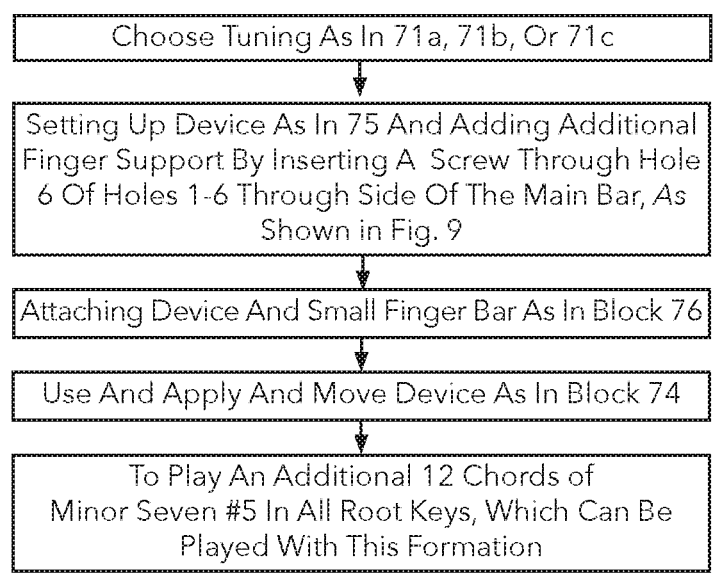
Figure 14B:
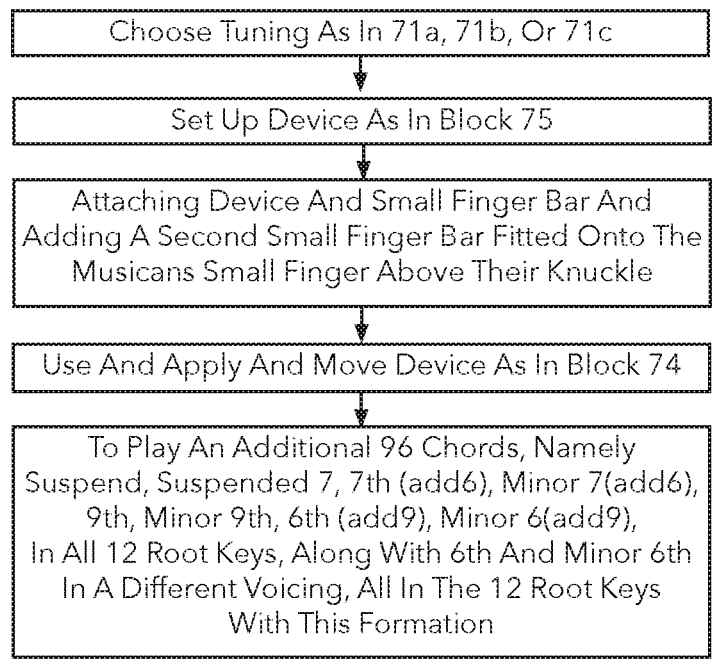

FIG. 14 shows the blocks 71a, 71b and 71c of FIG. 14A that connects to block 75 and shows the open tuning Cm7, Dm7 and Em7 that each can be played with the device 10 set up of FIGS. 1,1A, 2, 3 and 3A along with the set up of FIGS. 8 through 9, whereto the components of the device 10 can additionally include with the set up of FIGS. 1, 1A, 2, 3 and 3A, can include the addition of an additional finger support or finger supports, as shown in FIG. 14A. Further, as set out in FIG. 14B. The basic set up of the device 10, as shown in block 75, can include an addition of the small finger bar 60.

With the different set ups of the device 10 and fitting of the small finger bar 11, and, as needed, the second small finger bar 60 a musician can play essentially all the chords they could play before they became handicapped. Allowing them to play the the ninety six (96) chords for the basic set up of the device 10 and small finger bar 11 of FIGS. 1, 1A and 2, an additional one hundred thirty two (132) chords, with the other different set ups, as set out above, thereby affording the musician the ability to play, utilizing essentially the same rolling, pivoting and lifting of their hand as they move their hand up and down the instrument neck, and lifting and lowering of their small finger, all the chords as the musician could play before they became handicapped or lost or damaged a finger or fingers on their guitar neck holding hand.

Herein above has been shown and described a preferred embodiment of guitar fingering aid and method for its use of my invention. It should, however, be understood that the present disclosure is made by way of example only and that variations are possible without departing from the subject matter coming within the scope of the following claims, and a reasonable equivalency thereof, which subject matter I regard as my invention.

I claim:

1. A guitar fingering aid comprising, a device for fitting onto a musician's hand that grips a guitar type instrument neck where said device is arranged with mounting means to be mounted onto a middle finger of the musician's hand and connects across said middle finger top surface and includes at least one rectangular finger support with mounting means to maintain said finger support to a rectangular web of said device main bar utilizing a connector end of said mounting means through a hole formed through said rectangular web main bar whereby said finger support projects outwardly, at a right angle, from a face of said rectangular web main bar, and said rectangular web main bar further includes an instrument string engaging under surface that has a rounded cross section along its length, extends across said instrument neck, is secured to a lower surface of said rectangular web and has a length to extend across the instrument neck, and said guitar fingering aid further includes a small finger bar with means for maintaining it onto said musician's small finger, and which said small finger bar has a flat string engaging outer surface, whereby said device and small finger bar are moved by said musician's hand to rotate, pivot, tilt and vertical move said device and small finger bar along the instrument neck in response to said musician's hand movement along said instrument neck, sequentially moving said device and small finger bar string engaging outer surfaces into engagement with, to depress, selected instrument strings to play a musical composition.

2. The guitar fingering aid as recited in claim 1, wherein the device and small finger bar are formed by injection molding from a flexible material having an elasticity such that, when said device and small finger bar string engaging surfaces are pressed against the instrument strings, the material of said device and small finger bar will flex along the string sides, similar to the way the ends of a musician's finger flow across and partially down the instrument strings when the musician's fingers engage the instrument strings.

3. The guitar fingering aid as recited in claim 2, where the device and small finger bar are formed as individual components by molding or casting methods from soft vinyl or similar material.

4. The guitar fingering aid as recited in claim 1, wherein the device convex string engaging surface is formed with a concave surface between its opposite ends, and includes an arc formed therein of between nine and eighteen degrees, taken from a point of origin below said concave surface.

5. The guitar fingering aid as recited in claim 1, further including a pair of finger supports that each include a mounting means for attachment to side walls of the device rectangular main bar web; and said attachment means is a straight shaft that is threaded along its length to receive ends of said pair of finger supports turned thereon that are aligned to extend from opposite surfaces of said rectangular main bar web, or, alternatively, said pair of finger supports are each attached to opposite sides of said rectangular main pair web, where each said straight shaft has a screw head on one end thereof and is threaded along its length to each receive one of said pair of finger supports, whereby said finger supports are mounted out of alignment, and where said straight shafts fit through separate spaced holes formed through said rectangular main bar web, and each said finger support includes a cavity formed in one end thereof that receives a sleeve that is internally threaded to receive, and turn on, said shaft threaded end.

6. The guitar fingering aid as recited in claim 5, wherein a plurality of straight shafts, each having a screw head end with opposite threaded ends, and each straight shaft is arranged to fit through a different hole of a plurality of space apart holes that are formed through the rectangular main bar web, with said straight shaft threaded end, after passage through said hole of a plurality of spaced holes, is turned into the sleeve fitted into an end opening of each said finger support that said screw threaded end is turned into to where a head end of each said straight shaft engages a surface of said rectangular main bar web.

7. The guitar fingering aid as recited in claim 6, further including an outrigger bar that is formed by injection molding from a flexible material elastic material and has a longitudinal hole formed in one end thereof that receives a threaded sleeve fitted therein that has a screw head end and has been fitted through one of the plurality of the equal spaced holes formed through the rectangular web and extends, at a right angle, outwardly therefrom.

8. The guitar fingering aid as recited in claim 7, wherein the finger supports and rectangular outrigger bar longitudinal holes are formed off centered into an end of each said finger supports and outrigger bar.

9. The guitar fingering aid as recited in claim 1, wherein the mounting means for mounting the device and small finger bar are each a pair of straps that each connect, to extend from, a first side of a cradle that one of the musician's middle fingers and small finger are positioned on, respectively, and which said cradle has a second side that includes a pair of buckles therewith that each include a pair of spaced lateral slots formed thereacross, and are attached, in spaced apart relationship.

10. The guitar fingering aid as recited in claim 9, further including a keeper for each strap and buckle that is a continuous flattened loop means that is formed for sliding along each said strap to receive a said strap end fitted therethrough after it has passed through said buckle.

11. The guitar fingering aid as recited in claim 1, further including a second small finger bar that is like the small finger bar except that the head end of said second small finger bar flat instrument string engaging surface is thicker than that of said small finger bar.

12. A method for playing a musical composition using the guitar fingering aid that includes the steps of, open tuning a guitar type instrument in preparation for playing a musical selection; setting up a device of a guitar fingering aid for the selected open tuning; fitting said device and a small finger bar of said guitar fingering aid on to a hand of a musician that holds the guitar type instrument neck, whereby, the musician, by moving their said hand to slide said device and said small finger bar up and down the guitar type instrument neck, while rolling, pivoting and tilting said hand and lowering said device and raising and lowering said small finger such that said device and small finger bar sequentially contact, to press and release contact with said selected strings of the guitar type instrument, urging said selected strings onto and against said guitar type instrument frets, or between said instrument frets, while said musician, with their other hand that does not hold the instrument neck, strums or picks said guitar strings to play chords of the selected musical composition; and tuning the guitar type instrument in open tunings of Cm7, Dm7 or Em7; and setting up the device of the guitar fingering aid by mounting a finger support onto side of a rectangular web main bar and mounting the small finger bar onto the musician's small finger.

13. The method for playing a musical composition using the guitar fingering aid as recited in claim 12, further including the step of inserting a threaded rod through hole 3 formed in the rectangular web main bar and turning the finger support; and fitting the small finger bar onto the musician's small finger, between their knuckle and junction of the small finger with the musician's hand.

14. The method for playing a musical composition using the guitar fingering aid as recited in claim 13, further including the step of adding an additional finger support by inserting a threaded rod through hole 6 of the rectangular web main bar and turning said additional finger support thereon.

15. The method for playing a musical composition using the guitar fingering aid as recited in claim 14, further including the step of attaching an outrigger bar to the rectangular web main bar by inserting a threaded rod though an open hole of the rectangular web main bar and turning said outrigger bar thereon.

16. The method for playing a musical composition using the guitar fingering aid as recited in claim 14, further including the step of mounting a second small finger bar to the musician's small finger between the knuckle and small finger end; and adding additional finger supports to the rectangular web main bar and turning each said additional finger support onto a threaded shaft that has been fitted through an open hole or holes formed through the rectangular web main bar.

17. The method for playing a musical composition using the guitar fingering aid as recited in claim 12, further including the step of open tuning the guitar type instrument to an alternative open tuning; and setting up the device for said alternative open tuning to play a musical composition.

\* \* \* \* \*